United States Patent
Zhang et al.

(10) Patent No.: US 10,813,099 B2
(45) Date of Patent: Oct. 20, 2020

(54) RADIO BEARER CONFIGURATION METHOD AND SYSTEM

(71) Applicant: Huawei Technologies Co., Ltd., Shenzhen (CN)

(72) Inventors: Tao Zhang, Beijing (CN); Hao Bi, Rolling Meadows, IL (US); Bo Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 87 days.

(21) Appl. No.: 15/221,161

(22) Filed: Jul. 27, 2016

(65) Prior Publication Data

US 2016/0338038 A1 Nov. 17, 2016

Related U.S. Application Data

(63) Continuation of application No. PCT/CN2014/071682, filed on Jan. 28, 2014.

(51) Int. Cl.
*H04W 72/04* (2009.01)
*H04W 76/10* (2018.01)
(Continued)

(52) U.S. Cl.
CPC ......... *H04W 72/048* (2013.01); *H04L 5/0055* (2013.01); *H04W 72/0406* (2013.01);
(Continued)

(58) Field of Classification Search
CPC ........... H04W 72/048; H04W 72/0406; H04W 72/0453; H04W 72/085; H04W 76/10; H04L 5/0055
See application file for complete search history.

(56) References Cited

U.S. PATENT DOCUMENTS

2002/0187785 A1  12/2002  Iizuka
2007/0184838 A1   8/2007  Van Der Velde et al.
(Continued)

FOREIGN PATENT DOCUMENTS

CN  101242558 A  8/2008
CN  103139911 A  6/2013
(Continued)

OTHER PUBLICATIONS

Wiktionary; Definition of indicate; Nov. 3, 2012 (Wayback Machine).*
(Continued)

*Primary Examiner* — Ricky Q Ngo
*Assistant Examiner* — Stephen N Steiner
(74) *Attorney, Agent, or Firm* — Leydig, Voit & Mayer, Ltd.

(57) ABSTRACT

The base station serves includes: a sending unit, configured to send a request message to a second network device, where the request message is used to enable the second network device to generate a first configuration for a bearer of a user equipment UE, and a type of the bearer is type 2 or type 3; and a generating unit, configured to generate a second configuration for the bearer when it is determined that the type of the bearer is type 2, where the sending unit is further configured to: send the first configuration and the second configuration to the UE when it is determined that the type of the bearer is type 2, and send the first configuration to the UE.

24 Claims, 9 Drawing Sheets

(51) Int. Cl.
*H04L 5/00* (2006.01)
*H04W 72/08* (2009.01)
*H04W 76/11* (2018.01)

(52) U.S. Cl.
CPC ..... *H04W 72/0453* (2013.01); *H04W 72/085* (2013.01); *H04W 76/10* (2018.02); *H04W 76/11* (2018.02)

(56) References Cited

U.S. PATENT DOCUMENTS

| | | | |
|---|---|---|---|
| 2014/0269575 A1 | 9/2014 | Zhang et al. | |
| 2015/0043492 A1* | 2/2015 | Baek | H04W 76/025 370/329 |
| 2015/0092750 A1 | 4/2015 | Huang et al. | |
| 2016/0135174 A1* | 5/2016 | Lee | H04W 76/10 370/329 |
| 2016/0212790 A1* | 7/2016 | Fujishiro | H04L 45/24 |
| 2016/0234847 A1* | 8/2016 | Zhang | H04W 76/18 |
| 2016/0262149 A1* | 9/2016 | Futaki | H04W 16/32 |

FOREIGN PATENT DOCUMENTS

| | | |
|---|---|---|
| CN | 103517355 A | 1/2014 |
| RU | 2388181 C2 | 4/2010 |
| WO | 2011156769 A1 | 12/2011 |
| WO | 2013075602 A1 | 5/2013 |
| WO | 2013169048 A2 | 11/2013 |
| WO | 2014000610 A1 | 1/2014 |

OTHER PUBLICATIONS

"3$^{rd}$ Generation Partnership Project; Technical Specification Group Radio Access Network; Evolved Universal Terrestrial Radio Access Network (E-UTRAN); X2 application protocol (X2AP) (Release 12)," 3GPP TS 36.423, V12.0.0, pp. 1-144, 3$^{rd}$ Generation Partnership Project, Valbonne, France (Dec. 2013).

* cited by examiner

RADIO BEARER CONFIGURATION METHOD AND SYSTEM

CROSS-REFERENCE TO RELATED APPLICATIONS

This application is a continuation of International Patent Application No. PCT/CN2014/071682, filed on Jan. 28, 2014, which is hereby incorporated by reference in its entirety.

TECHNICAL FIELD

Embodiments of the present invention relate to the communications field, and in particular, to a radio bearer configuration method, a base station, and a system.

BACKGROUND

On a conventional radio network, one user equipment (UE) corresponds to one evolved NodeB (eNB), that is, at any time, one user equipment receives data packets only from one base station and sends data packets only to the base station. The forgoing received or sent data packets belong to one or more radio bearers (Radio Bearer, RB). With development of radio network technologies, a new type of network architecture is gradually being introduced. In this type of network architecture, one UE corresponds to multiple base stations, that is, the UE may receive data packets simultaneously from two or more than two base stations and may send data packets to two or more than two base stations. The forgoing received or sent data packets also belong to one or more radio bearers. Among the forgoing two or more than two base stations, only one base station can generate a radio resource control (RRC) message for configuring the UE, where the base station may be referred to as a master eNB (MeNB), and other base stations may all be referred to as secondary eNBs (SeNB). On the MeNB, a group to which a cell providing services for the UE belongs is a master cell group (MCG), and on an SeNB, a group to which a cell providing services for the UE belongs is a secondary cell group (SCG). In addition, in this type of network architecture, one base station may serve as an MeNB for one UE and may also serve as an SeNB for another UE, and therefore, a base station providing MeNB functions for one UE may be recorded as a first network device, and a base station providing SeNB functions for the UE may be recorded as a second network device, so as to distinguish the base stations.

In a network architecture in which one UE corresponds to multiple eNBs, a UE may support multiple types of radio bearers, including a type-1 bearer served only by an MCG, a type-2 bearer served by the MCG and an SCG at the same time, and a type-3 bearer served only by the SCG. For whichever types of bearers, configurations associated with the bearers are all generated, added to an RRC message, and sent to the UE by an MeNB, so that the UE uses these configurations to configure corresponding bearers. In the prior art, however, because an MeNB does not fully understand usage of radio resources of an SeNB, when the MeNB generates configurations for type-2 and type-3 bearers, a case that a generated configuration is inappropriate occurs, which reduces a radio resource utilization rate of the SeNB and reduces a throughput of a UE bearer. Therefore, proper configuration of type-2 and type-3 bearers becomes an urgent issue.

SUMMARY

Embodiments of the present invention provide a radio bearer configuration method, a base station, and a system, which enables proper configuration of a bearer, reduces configuration load of a first network device, and improves configuration efficiency.

According to a first aspect of the present invention, a network device is provided, where the network device is a first network device and includes:

a sending unit, configured to send a request message to a second network device, where the request message is used to enable the second network device to generate a first configuration for a bearer of a user equipment UE, and a type of the bearer is type 2 or type 3, where the type-2 bearer is served by the first network device and the second network device, and the type-3 bearer is served only by the second network device;

a receiving unit, configured to receive the first configuration generated by the second network device; and a generating unit, configured to generate a second configuration for the bearer when it is determined that the type of the bearer is type 2, where the sending unit is further configured to: send the first configuration and the second configuration to the UE when it is determined that the type of the bearer is type 2, and send the first configuration to the UE when it is determined that the type of the bearer is type 3.

In a first possible implementation manner, according to the first aspect, the first network device further includes:

a determining unit, configured to determine type information of the bearer and/or direction information of the first configuration, where the type information is used to indicate that the type of the bearer is type 2 or type 3, and the direction information is used to indicate that a direction of the first configuration is bidirectional, downlink unidirectional, or uplink unidirectional, where the sending unit is specifically configured to send the request message including the type information and/or the direction information.

In a second possible implementation manner, according to the first possible implementation manner:

the determining unit is specifically configured to determine the type information according to capability information of the UE and/or capability information of the second network device, where the capability information of the UE is used to indicate that a type of a bearer supported by the UE is type 2 and/or type 3, the capability information of the second network device is used to indicate that a type of a bearer supported by the second network device is type 2 and/or type 3, the capability information of the UE is sent by the UE or is system default, and the capability information of the second network device is sent by the second network device or is system default.

In a third possible implementation manner, according to the first possible implementation manner:

when the determining unit determines that the type of the bearer is type 2, the request message sent by the sending unit includes the second configuration; and when the determining unit determines that the type of the bearer is type 3, the request message sent by the sending unit does not include the second configuration.

In a fourth possible implementation manner, with reference to the first aspect and the third possible implementation manner:

the type information sent by the sending unit is capability information of the UE, where the capability information of the UE is used to indicate that a type of a bearer supported by the UE is type 2 or type 3, and the capability information of the UE is sent by the UE.

In a fifth possible implementation manner, according to the first possible implementation manner:

the type information sent by the sending unit is a first tunnel endpoint identifier or a second tunnel endpoint identifier, where the first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW, where when the determining unit determines that the type of the bearer is type 2, the type information sent by the sending unit is the first tunnel endpoint identifier; and when the determining unit determines that the type of the bearer is type 3, the type information sent by the sending unit is the second tunnel endpoint identifier.

In a sixth possible implementation manner, according to the first possible implementation manner:

the direction information sent by the sending unit is quality of service QoS of the bearer, where when the determining unit determines that the direction of the first configuration is bidirectional, the QoS sent by the sending unit includes uplink QoS and downlink QoS;

when the determining unit determines that the direction of the first configuration is uplink unidirectional, the QoS sent by the sending unit includes only uplink QoS; and when the determining unit determines that the direction of the first configuration is downlink unidirectional, the QoS sent by the sending unit includes only downlink QoS.

According to a second aspect of the present invention, a network device is provided, where the network device is a second network device and includes:

a receiving unit, configured to receive a request message sent by a first network device, where the request message is used to generate a first configuration for a bearer of a user equipment UE, and a type of the bearer is type 2 or type 3, where the type-2 bearer is served by the first network device and the second network device, and the type-3 bearer is served only by the second network device;

a generating unit, configured to generate the first configuration for the bearer of the user equipment UE according to the request message; and a sending unit, configured to send the first configuration to the first network device, so that the first network device sends the first configuration to the UE.

In a first possible implementation manner, according to the second aspect, the request message includes type information of the bearer and/or direction information of the first configuration, where the type information is used to indicate that the type of the bearer is type 2 or type 3, and the direction information is used to indicate that a direction of the first configuration is bidirectional, downlink unidirectional, or uplink unidirectional; and the second network device further includes:

a determining unit, configured to determine, according to the type information, that the type of the bearer is type 2 or type 3, and/or configured to determine, according to the direction information, that the direction of the first configuration is bidirectional, downlink unidirectional, or uplink unidirectional, where the generating unit is further configured to: generate the first configuration for the bearer according to the type of the bearer if the determining unit is configured to determine, according to the type information, that the type of the bearer is type 2 or type 3; generate the first configuration for the bearer according to the direction of the first configuration if the determining unit is configured to determine, according to the direction information, that the direction of the first configuration is bidirectional, downlink unidirectional, or uplink unidirectional; and generate the first configuration for the bearer according to the type of the bearer and the direction of the first configuration if the determining unit is configured to determine, according to the type information, that the type of the bearer is type 2 or type 3 and determine, according to the direction information, that the direction of the first configuration is bidirectional, downlink unidirectional, or uplink unidirectional.

In a second possible implementation manner, according to the first possible implementation manner:

the request message includes or does not include a second configuration generated by the first network device for the bearer, where the second configuration is at least one of an identifier of the bearer, an identifier of an enhanced packet system EPS bearer corresponding to the bearer, a configuration of a first Packet Data Convergence Protocol PDCP entity, a configuration of a first Radio Link Control RLC entity, a configuration of a first logical channel LCH, a configuration of a first Media Access Control MAC entity, and a configuration of a first physical PHY entity, where the first PDCP entity, the first RLC entity, the first LCH, the first MAC entity, and the first PHY entity are all associated with the bearer, where when the request message received by the receiving unit includes the second configuration, the determining unit determines that the type of the bearer is type 2; and when the request message received by the receiving unit does not include the second configuration, the determining unit determines that the type of the bearer is type 3.

In a third possible implementation manner, according to the first possible implementation manner:

the type information received by the receiving unit is capability information of the UE, where the capability information of the UE is used to indicate a type of a bearer supported by the UE, where when the capability information of the UE received by the receiving unit indicates that the type of the bearer supported by the UE is type 2, the determining unit determines that the type of the bearer is type 2; and when the capability information of the UE received by the receiving unit indicates that the type of the bearer supported by the UE is type 3, the determining unit determines that the type of the bearer is type 3.

In a fourth possible implementation manner, according to the first possible implementation manner:

the type information received by the receiving unit is a first tunnel endpoint identifier or a second tunnel endpoint identifier, where the first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW, where when the request message received by the receiving unit includes the first tunnel endpoint identifier, the determining unit determines that the type of the bearer is type 2; and when the request message received by the receiving unit includes the second tunnel endpoint identifier, the determining unit determines that the type of the bearer is type 3.

In a fifth possible implementation manner, with reference to the second aspect, the first possible implementation manner, the second possible implementation manner, the third possible implementation manner, and the fourth possible implementation manner:

when the determining unit determines that the type of the bearer is type 3, the first configuration generated by the generating unit includes a configuration of a second PDCP entity, where the second PDCP entity is associated with the bearer; and when the determining unit determines that the type of the bearer is type 2, the first configuration generated by the generating unit does not include the configuration of the second PDCP entity.

In a sixth possible implementation manner, according to the first possible implementation manner:

the first configuration generated by the generating unit further includes at least one of an identifier of the bearer, an identifier of an EPS bearer corresponding to the bearer, a configuration of a second RLC entity, a configuration of a second LCH, a configuration of a second MAC entity, and a configuration of a second PHY entity, where the second RLC entity, the second LCH, the second MAC entity, and the second PHY entity are associated with the bearer.

In a seventh possible implementation manner, with reference to the first possible implementation manner or the sixth possible implementation manner:

the direction information received by the receiving unit is quality of service QoS of the bearer, where if the QoS received by the receiving unit includes uplink QoS and downlink QoS, the determining unit determines that the direction of the first configuration is bidirectional;

if the QoS received by the receiving unit includes only uplink QoS, the determining unit determines that the direction of the first configuration is uplink unidirectional; and if the QoS received by the receiving unit includes only downlink QoS, the determining unit determines that the direction of the first configuration is downlink unidirectional.

According to a third aspect of the present invention, a UE is provided and includes:

a receiving unit, configured to receive a first configuration and a second configuration that are sent by a first network device, or configured to receive a first configuration sent by the first network device, where the first configuration is generated by a second network device and is sent by the second network device to the first network device, and the second configuration is generated by the first network device; and a processing unit, configured to configure a bearer according to the first configuration and the second configuration that are received by the receiving unit, or configured to configure the bearer according to the first configuration received by the receiving unit.

In a first possible implementation manner, according to the third aspect, the UE further includes:

a sending unit, configured to send capability information of the UE to the first network device, where the capability information of the UE is used to indicate that a type of a bearer supported by the UE is type 2 and/or type 3, where the type-2 bearer is served by the first network device and the second network device, and the type-3 bearer is served only by the second network device.

According to a fourth aspect of the present invention, a radio bearer configuration method is provided and includes:

sending a request message to a second network device, where the request message is used to enable the second network device to generate a first configuration for a bearer of a user equipment UE, and a type of the bearer is type 2 or type 3, where the type-2 bearer is served by the first network device and the second network device, and the type-3 bearer is served only by the second network device;

receiving the first configuration generated by the second network device;

generating a second configuration for the bearer when it is determined that the type of the bearer is type 2; and sending the first configuration and the second configuration to the UE when it is determined that the type of the bearer is type 2, and sending the first configuration to the UE when it is determined that the type of the bearer is type 3.

In a first possible implementation manner, according to the fourth aspect, before the sending a request message to a second network device, the method further includes:

determining type information of the bearer and/or direction information of the first configuration, where the type information is used to indicate that the type of the bearer is type 2 or type 3, and the direction information is used to indicate that a direction of the first configuration is bidirectional, downlink unidirectional, or uplink unidirectional, and the sending a request message to a second network device includes:

sending the request message including the type information and/or the direction information to the second network device.

In a second possible implementation manner, according to the first possible implementation manner, the determining type information of the bearer includes:

determining the type information according to capability information of the UE and/or capability information of the second network device, where the capability information of the UE is used to indicate that a type of a bearer supported by the UE is type 2 and/or type 3, the capability information of the second network device is used to indicate that a type of a bearer supported by the second network device is type 2 and/or type 3, the capability information of the UE is sent by the UE or is system default, and the capability information of the second network device is sent by the second network device or is system default.

In a third possible implementation manner, according to the first possible implementation manner, the sending the request message including the type information to the second network device includes:

when it is determined that the type of the bearer is type 2, the sent request message includes the second configuration; and when it is determined that the type of the bearer is type 3, the sent request message does not include the second configuration.

In a fourth possible implementation manner, according to the first possible implementation manner:

the type information is capability information of the UE, where the capability information of the UE is used to indicate that a type of a bearer supported by the UE is type 2 or type 3, and the capability information of the UE is sent by the UE.

In a fifth possible implementation manner, according to the first possible implementation manner:

the type information is a first tunnel endpoint identifier or a second tunnel endpoint identifier, where the first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW; and the sending the request message including the type information to the second network device includes:

when it is determined that the type of the bearer is type 2, the sent type information is the first tunnel endpoint identifier; and when it is determined that the type of the bearer is type 3, the sent type information is the second tunnel endpoint identifier.

In a sixth possible implementation manner, according to the first possible implementation manner:

the sent direction information is quality of service QoS of the bearer; and the sending the request message including the direction information to the second network device includes:

when it is determined that the direction of the first configuration is bidirectional, the sent QoS includes uplink QoS and downlink QoS;

when it is determined that the direction of the first configuration is uplink unidirectional, the sent QoS includes only uplink QoS; and when it is determined that the direction of the first configuration is downlink unidirectional, the sent QoS includes only downlink QoS.

According to a fifth aspect of the present invention, a radio bearer configuration method is provided and includes:

receiving a request message sent by a first network device, where the request message is used to generate a first configuration for a bearer of a user equipment UE, and a type of the bearer is type 2 or type 3, where the type-2 bearer is served by the first network device and a second network device, and the type-3 bearer is served only by the second network device;

generating the first configuration for the bearer of the user equipment UE according to the request message; and sending the first configuration to the first network device, so that the first network device sends the first configuration to the UE.

In a first possible implementation manner, according to the fifth aspect, the request message includes type information of the bearer and/or direction information of the first configuration, where the type information is used to indicate that the type of the bearer is type 2 or type 3, and the direction information is used to indicate that a direction of the first configuration is bidirectional, downlink unidirectional, or uplink unidirectional; and the generating the first configuration for the bearer of the user equipment UE according to the request message includes:

determining, according to the type information, that the type of the bearer is type 2 or type 3, and/or determining, according to the direction information, that the direction of the first configuration is bidirectional, downlink unidirectional, or uplink unidirectional; and generating the first configuration for the bearer according to the type of the bearer if it is determined, according to the type information, that the type of the bearer is type 2 or type 3; generating the first configuration for the bearer according to the direction of the first configuration if it is determined, according to the direction information, that the direction of the first configuration is bidirectional, downlink unidirectional, or uplink unidirectional; and generating the first configuration for the bearer according to the type of the bearer and the direction of the first configuration if it is determined, according to the type information, that the type of the bearer is type 2 or type 3 and it is determined, according to the direction information, that the direction of the first configuration is bidirectional, downlink unidirectional, or uplink unidirectional.

In a second possible implementation manner, according to the first possible implementation manner:

the request message includes or does not include a second configuration generated by the first network device for the bearer, where the second configuration is at least one of an identifier of the bearer, an identifier of an enhanced packet system EPS bearer corresponding to the bearer, a configuration of a first Packet Data Convergence Protocol PDCP entity, a configuration of a first Radio Link Control RLC entity, a configuration of a first logical channel LCH, a configuration of a first Media Access Control MAC entity, and a configuration of a first physical PHY entity, where the first PDCP entity, the first RLC entity, the first LCH, the first MAC entity, and the first PHY entity are all associated with the bearer; and the determining, according to the type information, that the type of the bearer is type 2 or type 3 includes:

when the received request message includes the second configuration, determining that the type of the bearer is type 2; and when the received request message does not include the second configuration, determining that the type of the bearer is type 3.

In a third possible implementation manner, according to the first possible implementation manner:

the type information is capability information of the UE, where the capability information of the UE is used to indicate a type of a bearer supported by the UE; and the determining, according to the type information, that the type of the bearer is type 2 or type 3 includes:

when the received capability information of the UE indicates that the type of the bearer supported by the UE is type 2, determining that the type of the bearer is type 2; and when the received capability information of the UE indicates that the type of the bearer supported by the UE is type 3, determining that the type of the bearer is type 3.

In a fourth possible implementation manner, according to the first possible implementation manner:

the type information is a first tunnel endpoint identifier or a second tunnel endpoint identifier, where the first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW; and the determining, according to the type information, that the type of the bearer is type 2 or type 3 includes:

when the received request message includes the first tunnel endpoint identifier, determining that the type of the bearer is type 2; and when the received request message includes the second tunnel endpoint identifier, determining that the type of the bearer is type 3.

In a fifth possible implementation manner, with reference to the fifth aspect, the first possible implementation manner, the second possible implementation manner, the third possible implementation manner, and the fourth possible implementation manner, the generating the first configuration for the bearer of the user equipment UE according to the request message includes:

when it is determined that the type of the bearer is type 3, the generated first configuration includes a configuration of a second PDCP entity, where the second PDCP entity is associated with the bearer; and when it is determined that the type of the bearer is type 2, the generated first configuration does not include the configuration of the second PDCP entity.

In a sixth possible implementation manner, according to the first possible implementation manner:

the direction information is quality of service QoS of the bearer; and the determining, according to the direction information, that the direction of the first configuration is bidirectional, downlink unidirectional, or uplink unidirectional includes:

if the received QoS includes uplink QoS and downlink QoS, determining that the direction of the first configuration is bidirectional;

if the received QoS includes only uplink QoS, determining that the direction of the first configuration is uplink unidirectional; and if the received QoS includes only downlink QoS, determining that the direction of the first configuration is downlink unidirectional.

In a seventh possible implementation manner, with reference to the first possible implementation manner or the sixth possible implementation manner:

the first configuration includes a configuration of a second RLC entity, where the second RLC entity is associated with the bearer; and the generating the first configuration for the bearer according to the direction of the first configuration if it is determined, according to the direction information, that the direction of the first configuration is bidirectional, downlink unidirectional, or uplink unidirectional includes:

when it is determined that the direction of the first configuration is bidirectional, the configuration of the second RLC entity includes an RLC uplink configuration and an RLC downlink configuration;

when it is determined that the direction of the first configuration is downlink unidirectional, the configuration of the second RLC entity includes only an RLC downlink configuration; and when it is determined that the direction of the first configuration is uplink unidirectional, the configuration of the second RLC entity includes only an RLC uplink configuration.

According to a sixth aspect of the present invention, a radio bearer configuration method is provided and includes:

receiving a first configuration and a second configuration that are sent by a first network device, or receiving a first configuration sent by the first network device, where the first configuration is generated by a second network device and is sent by the second network device to the first network device, and the second configuration is generated by the first network device; and configuring a bearer according to the received first configuration and second configuration, or configuring the bearer according to the received first configuration.

In a first possible implementation manner, according to the sixth aspect, before the receiving a first configuration and a second configuration that are sent by a first network device, or before the receiving a first configuration sent by the first network device, the method further includes:

sending capability information of a UE to the first network device, where the capability information of the UE is used to indicate that a type of a bearer supported by the UE is type 2 and/or type 3, where the type-2 bearer is served by the first network device and the second network device, and the type-3 bearer is served only by the second network device.

In a second possible implementation manner, according to the first possible implementation manner, the method further includes:

receiving the first configuration and the second configuration that are sent by the first network device, where the second configuration includes at least one of an identifier of the bearer, an identifier of an enhanced packet system EPS bearer corresponding to the bearer, a configuration of a first Packet Data Convergence Protocol PDCP entity, a configuration of a first Radio Link Control RLC entity, a configuration of a first logical channel LCH, a configuration of a first Media Access Control MAC entity, and a configuration of a first physical PHY entity, and the first configuration includes at least one of the identifier of the bearer, the identifier of the EPS bearer corresponding to the bearer, a configuration of a second RLC entity, a configuration of a second LCH, a configuration of a second MAC entity, and a configuration of a second PHY entity, where the first PDCP entity, the first RLC entity, the first LCH, the first MAC entity, the first PHY entity, the second RLC entity, the second LCH, the second MAC entity, and the second PHY entity are associated with the bearer, and the configuration of the second RLC entity includes an RLC uplink configuration and/or an RLC downlink configuration.

In a third possible implementation manner, with reference to the first possible implementation manner or the second possible implementation manner, the method further includes:

receiving the first configuration sent by the first network device, where the first configuration includes at least one of the identifier of the bearer, the identifier of the EPS bearer corresponding to the bearer, a configuration of a second PDCP entity, the configuration of the second RLC entity, the configuration of the second LCH, the configuration of the second MAC entity, and the configuration of the second PHY entity, where the second PDCP entity, the second RLC entity, the second LCH, the second MAC entity, and the second PHY entity are associated with the bearer, and the configuration of the second RLC entity includes the RLC uplink configuration and/or the RLC downlink configuration.

In a fourth possible implementation manner, according to the first possible implementation manner or the second possible implementation manner, the configuring a bearer according to the received first configuration and second configuration includes:

establishing the first PDCP entity, the first RLC entity, and the first LCH respectively according to the configuration of the first PDCP entity, the configuration of the first RLC entity, and the configuration of the first LCH, establishing the second RLC entity and the second LCH respectively according to the configuration of the second RLC entity and the configuration of the second LCH, and indicating to a non-access stratum NAS that the bearer has been established and the identifier of the EPS bearer; or releasing the first PDCP entity, the first RLC entity, and the first LCH, and establishing a second PDCP entity, the second RLC entity, and the second LCH respectively according to a configuration of the second PDCP entity, the configuration of the second RLC entity, and the configuration of the second LCH; or modifying a first PDCP entity, the first RLC entity, or the first LCH respectively according to the configuration of the first PDCP entity, the configuration of the first RLC entity, or the configuration of the first LCH, and establishing the second RLC entity and the second LCH respectively according to the configuration of the second RLC entity and the configuration of the second LCH; or releasing a second PDCP entity, the second RLC entity, and the second LCH, and newly establishing the first PDCP entity, the first RLC entity, and the first LCH respectively according to the configuration of the first PDCP entity, the configuration of the first RLC entity, and the configuration of the first LCH; or releasing the second PDCP entity, the second RLC entity, and the second LCH, establishing the first PDCP entity, the first RLC entity, and the first LCH respectively according to the configuration of the first PDCP entity, the configuration of the first RLC entity, and the configuration of the first LCH, and establishing the second RLC entity and the second LCH respectively according to the configuration of the second RLC entity and the configuration of the second LCH; or releasing the first PDCP entity, the first RLC entity, and the first LCH, releasing the second RLC entity and the second LCH, and indicating to a non-access stratum NAS that the bearer has been released and the identifier of the EPS bearer; or releasing the second RLC entity and the second LCH, and modifying the first PDCP entity, the first RLC entity, or the first LCH respectively according to the configuration of the first PDCP entity, the configuration of the first RLC entity, or the configuration of the first LCH; or releasing the first PDCP entity, the first RLC entity, and the first LCH, releasing the second RLC entity and the second LCH, and establishing a second PDCP entity, the second RLC entity, and the second LCH respectively according to a configuration of the second PDCP entity, the configuration of the second RLC entity, and the configuration of the second LCH; or modifying the first PDCP entity, the first RLC entity, the first LCH, the second RLC entity, or the second LCH respectively according to the configuration of the first PDCP entity, the configuration of the first RLC entity, the configuration of the first LCH, the configuration of the second RLC entity, or the configuration of the second LCH; or establishing or modifying the first MAC entity according to the configuration of the first MAC entity; or releasing the first MAC entity; or establishing or modifying the first PHY entity according to the configuration of the first PHY entity; or releasing the first PHY entity; or establishing or modifying the second MAC entity according to the configuration of the second MAC entity; or releasing the second MAC entity; or establishing or modifying the second PHY entity according to the configuration of the second PHY entity; or releasing the second PHY entity.

In a fifth possible implementation manner, according to the third possible implementation manner, the configuring the bearer according to the received first configuration includes:

establishing the second PDCP entity, the second RLC entity, and the second LCH respectively according to the configuration of the second PDCP entity, the configuration of the second RLC entity, and the configuration of the second LCH, and indicating to a NAS that the bearer has been established and the identifier of the EPS bearer; or modifying the second PDCP entity, the second RLC entity, or the second LCH respectively according to the configuration of the second PDCP entity, the configuration of the second RLC entity, or the configuration of the second LCH; or releasing the second PDCP entity, the second RLC entity, and the second LCH, and indicating to a NAS that the bearer has been released and the identifier of the EPS bearer; or establishing or modifying the second MAC entity according to the configuration of the second MAC entity; or releasing the second MAC entity; or establishing or modifying the second PHY entity according to the configuration of the second PHY entity; or releasing the second PHY entity.

According to a seventh aspect of the present invention, a network device is provided, where the network device is a first network device and includes:

a sender, configured to send a request message to a second network device, where the request message is used to enable the second network device to generate a first configuration for a bearer of a user equipment UE, and a type of the bearer is type 2 or type 3, where the type-2 bearer is served by the first network device and the second network device, and the type-3 bearer is served only by the second network device;

a receiver, configured to receive the first configuration generated by the second network device; and a processor, configured to generate a second configuration for the bearer when it is determined that the type of the bearer is type 2, where the sender is further configured to: send the first configuration and the second configuration to the UE when it is determined that the type of the bearer is type 2, and send the first configuration to the UE when it is determined that the type of the bearer is type 3.

In a first possible implementation manner, according to the seventh aspect, the first network device further includes:

the processor is further configured to determine type information of the bearer and/or direction information of the first configuration, where the type information is used to indicate that the type of the bearer is type 2 or type 3, and the direction information is used to indicate that the direction information of the first configuration is bidirectional, downlink unidirectional, or uplink unidirectional; and the sender is specifically configured to send the request message including the type information and/or the direction information.

In a second possible implementation manner, according to the first possible implementation manner:

the processor is specifically configured to determine the type information according to capability information of the UE and/or capability information of the second network device, where the capability information of the UE is used to indicate that a type of a bearer supported by the UE is type 2 and/or type 3, the capability information of the second network device is used to indicate that a type of a bearer supported by the second network device is type 2 and/or type 3, the capability information of the UE is sent by the UE or is system default, and the capability information of the second network device is sent by the second network device or is system default.

In a third possible implementation manner, according to the first possible implementation manner:

when the processor determines that the type of the bearer is type 2, the request message sent by the sender includes the second configuration; and when the processor determines that the type of the bearer is type 3, the request message sent by the sender does not include the second configuration.

In a fourth possible implementation manner, with reference to the seventh aspect and the third possible implementation manner:

the type information sent by the sender is capability information of the UE, where the capability information of the UE is used to indicate that a type of a bearer supported by the UE is type 2 or type 3, and the capability information of the UE is sent by the UE.

In a fifth possible implementation manner, according to the first possible implementation manner:

the type information sent by the sender is a first tunnel endpoint identifier or a second tunnel endpoint identifier, where the first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW, where when the processor determines that the type of the bearer is type 2, the type information sent by the sender is the first tunnel endpoint identifier; and when the processor determines that the type of the bearer is type 3, the type information sent by the sender is the second tunnel endpoint identifier.

In a sixth possible implementation manner, according to the first possible implementation manner:

the direction information sent by the sender is quality of service QoS of the bearer, where the direction information sent by the sender is quality of service QoS of the bearer, where when the processor determines that the direction of the first configuration is bidirectional, the QoS sent by the sender includes uplink QoS and downlink QoS;

when the processor determines that the direction of the first configuration is uplink unidirectional, the QoS sent by the sender includes only uplink QoS; and when the processor determines that the direction of the first configuration is downlink unidirectional, the QoS sent by the sender includes only downlink QoS.

According to an eighth aspect of the present invention, a network device is provided, where the network device is a second network device and includes:

a receiver, configured to receive a request message sent by a first network device, where the request message is used to generate a first configuration for a bearer of a user equipment UE, and a type of the bearer is type 2 or type 3, where the type-2 bearer is served by the first network device and the second network device, and the type-3 bearer is served only by the second network device;

a processor, configured to generate the first configuration for the bearer of the user equipment UE according to the request message; and a sender, configured to send the first configuration to the first network device, so that the first network device sends the first configuration to the UE.

In a first possible implementation manner, according to the eighth aspect, the request message includes type information of the bearer and/or direction information of the first configuration, where the type information is used to indicate that the type of the bearer is type 2 or type 3, and the direction information is used to indicate that the direction information of the first configuration is bidirectional, downlink unidirectional, or uplink unidirectional; and the processor is further configured to determine, according to the type information, that the type of the bearer is type 2 or type 3, and/or configured to determine, according to the direction information, that the direction of the first configuration is bidirectional, downlink unidirectional, or uplink unidirectional; and the processor is further configured to: generate the first configuration for the bearer according to the type of the bearer if it is determined, according to the type information, that the type of the bearer is type 2 or type 3; generate the first configuration for the bearer according to the direction of the first configuration if it is determined, according to the direction information, that the direction of the first configuration is bidirectional, downlink unidirectional, or uplink unidirectional; and generate the first configuration for the bearer according to the type of the bearer and the direction of the first configuration if it is determined, according to the type information, that the type of the bearer is type 2 or type 3 and it is determined, according to the direction information, that the direction of the first configuration is bidirectional, downlink unidirectional, or uplink unidirectional.

In a second possible implementation manner, according to the first possible implementation manner:

the request message includes or does not include a second configuration generated by the first network device for the bearer, where the second configuration is at least one of an identifier of the bearer, an identifier of an enhanced packet system EPS bearer corresponding to the bearer, a configuration of a first Packet Data Convergence Protocol PDCP entity, a configuration of a first Radio Link Control RLC entity, a configuration of a first logical channel LCH, a configuration of a first Media Access Control MAC entity, and a configuration of a first physical PHY entity, where the first PDCP entity, the first RLC entity, the first LCH, the first MAC entity, and the first PHY entity are all associated with the bearer, where when the request message received by the receiver includes the second configuration, the processor determines that the type of the bearer is type 2; and when the request message received by the receiver does not include the second configuration, the processor determines that the type of the bearer is type 3.

In a third possible implementation manner, according to the first possible implementation manner:

the type information received by the receiver is capability information of the UE, where the capability information of the UE is used to indicate a type of a bearer supported by the UE, where when the capability information of the UE received by the receiver indicates that the type of the bearer supported by the UE is type 2, the processor determines that the type of the bearer is type 2; and when the capability information of the UE received by the receiver indicates that the type of the bearer supported by the UE is type 3, the processor determines that the type of the bearer is type 3.

In a fourth possible implementation manner, according to the first possible implementation manner:

the type information received by the receiver is a first tunnel endpoint identifier or a second tunnel endpoint identifier, where the first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW, where when the request message received by the receiver includes the first tunnel endpoint identifier, the processor determines that the type of the bearer is type 2; and when the request message received by the receiver includes the second tunnel endpoint identifier, the processor determines that the type of the bearer is type 3.

In a fifth possible implementation manner, with reference to the eighth aspect, the first possible implementation manner, the second possible implementation manner, the third possible implementation manner, and the fourth possible implementation manner:

when the processor determines that the type of the bearer is type 3, the first configuration generated by the processor includes a configuration of a second PDCP entity, where the second PDCP entity is associated with the bearer; and when the processor determines that the type of the bearer is type 2, the first configuration generated by the processor does not include the configuration of the second PDCP entity.

In a sixth possible implementation manner, according to the first possible implementation manner:

the direction information received by the receiver is quality of service QoS of the bearer, where if the QoS received by the receiver includes uplink QoS and downlink QoS, the processor determines that the direction of the first configuration is bidirectional;

if the QoS received by the receiver includes only uplink QoS, the processor determines that the direction of the first configuration is uplink unidirectional; and if the QoS received by the receiver includes only downlink QoS, the processor determines that the direction of the first configuration is downlink unidirectional.

In a seventh possible implementation manner, with reference to the first possible implementation manner or the sixth possible implementation manner:

the first configuration generated by the processor includes a configuration of a second RLC entity, where the second RLC entity is associated with the bearer, where when the processor determines that the direction of the first configuration is bidirectional, the configuration of the second RLC entity includes an RLC uplink configuration and an RLC downlink configuration;

when the processor determines that the direction of the first configuration is downlink unidirectional, the configuration of the second RLC entity includes only an RLC downlink configuration; and when the processor determines that the direction of the first configuration is uplink unidirectional, the configuration of the second RLC entity includes only an RLC uplink configuration.

According to a ninth aspect of the present invention, a UE is provided and includes:

a receiver, configured to receive a first configuration and a second configuration that are sent by a first network device, or configured to receive a first configuration sent by the first network device, where the first configuration is generated by a second network device and is sent by the second network device to the first network device, and the second configuration is generated by the first network device; and a processor, configured to configure a bearer according to the first configuration and the second configuration that are received by the receiver, or configured to configure the bearer according to the first configuration received by the receiver.

In a first possible implementation manner, according to the ninth aspect, the UE further includes:

a sender, configured to send capability information of the UE to the first network device, where the capability information of the UE is used to indicate that a type of a bearer supported by the UE is type 2 and/or type 3, where the type-2 bearer is served by the first network device and the second network device, and the type-3 bearer is served only by the second network device.

According to a tenth aspect of the present invention, a system is provided and includes:

the first network device according to any one of the foregoing first aspect and its implementation manners;

the second network device according to any one of the foregoing second aspect and its implementation manners; and at least one UE according to any one of the foregoing third aspect and its implementation manners.

According to an eleventh aspect of the present invention, a system is provided and includes:

the first network device according to any one of the foregoing seventh aspect and its implementation manners;

the second network device according to any one of the foregoing eighth aspect and its implementation manners; and at least one UE according to any one of the foregoing ninth aspect and its implementation manners.

According to the radio bearer configuration method, the base station, and the system provided by the embodiments of the present invention, a first network device sends a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
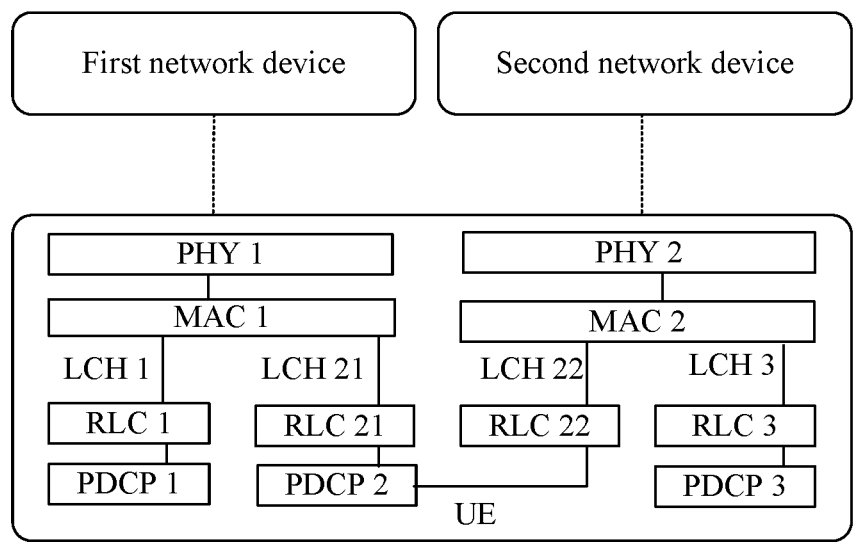
FIG. 1 is a schematic diagram of multiple types of bearers of one UE according to the present invention.

It should be noted that, in a network architecture in which one UE corresponds to multiple eNBs, a UE can support multiple types of radio bearers. FIG. 1 is a schematic diagram of multiple types of bearers of one UE according to the present invention. As shown in FIG. 1, one UE may have the following three types of radio bearers at the same time: type 1, type 2, or type 3.

A type-1 radio bearer is served only by an MCG. That is, data packets received by the UE on the bearer come only from a first network device, that is, an MeNB, and data packets sent by the UE on the bearer are sent only to the MeNB. The first network device or a second network device may be an eNB, a Node Base (Node Base, NB), a radio network controller (Radio Network Controller, RNC), a WiFi, an access point (AP), or the like. Inside the UE, there is one Packet Data Convergence Protocol (PDCP) entity, one Radio Link Control (RLC) entity, one logical channel (LCH), one Medium Access Control (MAC) entity, and one physical layer (PHY) entity that are associated with the type-1 bearer, that is, PDCP 1, RLC 1, LCH 1, MAC 1, and PHY 1 shown in FIG. 1.

A type-2 radio bearer is served by the MCG and an SCG at the same time, that is, some data packets received by the UE on the bearer come from the first network device and some data packets come from the second network device, and some of data packets sent by the UE on the bearer are sent to the first network device and some are sent to the second network device. Inside the UE, there is one PDCP entity, two RLC entities, two LCHs, two MAC entities, and two PHY entities that are associated with the type-2 bearer, that is, PDCP 2, RLC21, RLC 22, LCH 21, LCH 22, MAC 1, MAC 2, PHY 1, and PHY 2 shown in FIG. 1.

A type-3 radio bearer is served only by the SCG, in other words, data packets received by the UE on the bearer come only from the second network device, and data packets sent by the UE on the bearer are sent only to the second network device. Inside the UE, there is one PDCP entity, one RLC entity, one LCH, one MAC entity, and one PHY entity that are associated with the type-3 bearer, that is, PDCP 3, RLC 3, LCH 3, MAC 2, and PHY 2 shown in FIG. 1.

The protocol entities and the logical channel, PDCP 2, RLC 21, LCH 21, MAC 1, and PHY 1, correspond to the MCG and are respectively called a first PDCP entity, a first RLC entity, a first LCH, a first MAC entity, and a first PHY entity in the present invention; and the protocol entities and logical channels, PDCP 3, RLC 22, RLC 3, LCH 22, LCH 3, MAC 2, and PHY 2, correspond to the SCG, and in the present invention, PDCP 3 is called a second PDCP entity, both RLC 22 and RLC 3 are called second RLC entities, both LCH 22 and LCH 3 are called second LCHs, MAC 2 is called a second MAC entity, and PHY 2 is called a second PHY entity.

Further, configurations of the foregoing protocol entities and LCHs are specifically as follows: A configuration of a PDCP entity includes timing duration of a packet loss timer, a length of a PDCP sequence number, a parameter required for a header compression operation, and the like. A configuration of an RLC entity varies according to a direction of the bearer: when the bearer is bidirectional, that is, when the UE receives user data on the bearer and also sends user data on the bearer, the configuration includes a configuration related to an uplink RLC and a configuration related to a downlink RLC, where the configuration related to the uplink RLC may include a maximum number of automatic repeat requests (ARQ), a repeat polling (Poll) timer, and the like, and the configuration related to the downlink RLC includes timing duration of a resequencing timer, timing duration of a status report prohibition timer, and the like; when the bearer is downlink unidirectional, that is, when the UE only receives user data on the bearer, the configuration includes only a downlink RLC configuration; and when the bearer is uplink unidirectional, that is, when the UE only sends user data on the bearer, the configuration includes only an uplink RLC configuration. A configuration of an LCH includes an identifier of the LCH, a priority of the LCH, a prioritised bit rate (PBR), bucket size duration (BSD), a LCH group identifier, and the like. A configuration of a MAC entity includes an identifier of the MAC entity, an identifier of a cell group to which the MAC entity belongs, a maximum number of hybrid automatic repeat requests (HARD), timing duration of a timer related to a buffer status report (BSR), timing duration of a timer related to a discontinuous reception (DRX) operation, timing duration of a time alignment (TA) timer, timing duration of a timer related to a power headroom report (PHR), timing duration of a scheduling request (Scheduling Request, SR) prohibition timer, and the like; and the configuration of the MAC entity may also be an empty configuration, that is, the configuration of the MAC entity does not include any information. A configuration of a PHY entity includes an identifier of the PHY entity, an identifier of a cell or cell group associated with the PHY entity, configurations of physical channels, a configuration of uplink power control, configurations of physical signals, and the like; and the configuration of the PHY entity may also be an empty configuration, that is, the configuration of the PHY entity does not include any information.

Figure 2:
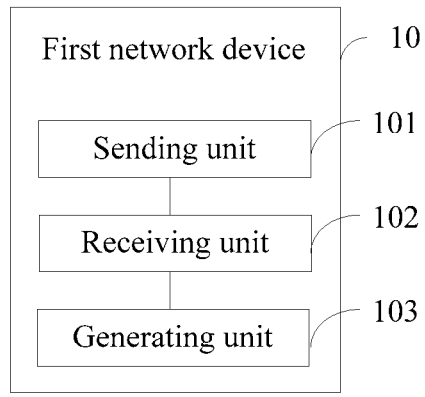
FIG. 2 is a schematic structural diagram of an embodiment of a first network device according to the present invention.

FIG. 2 is a schematic structural diagram of an embodiment of a first network device according to the present invention. As shown in FIG. 2, a first network device 10 includes a sending unit 101, a receiving unit 102, and a generating unit 103.

It should be noted that it is a prior art how a first network device provides a configuration of a type-1 bearer for a UE, which is not repeatedly described in this embodiment. This embodiment is mainly described by using configurations of a type-2 bearer and a type-3 bearer as examples.

The sending unit 101 is configured to send a request message to a second network device, where the request message is used to enable the second network device to generate a first configuration for a bearer of a UE, and a type of the bearer is type 2 or type 3, where a type-2 bearer is served by the first network device and the second network device, and a type-3 bearer is served only by the second network device.

For example, the request message may include at least one of type information and direction information, where the type information is used to indicate that the type of the bearer is type 2 or type 3, and the direction information is used to indicate that a direction of the first configuration is bidirectional, downlink unidirectional, or uplink unidirectional.

The receiving unit 102 is configured to receive the first configuration generated by the second network device.

For example, the first configuration generated by the second network device may be the following configurations generated by the second network device according to the received request information:

when the type information is type 2 and the direction indicated by the direction information is bidirectional, the first configuration is an identifier of the bearer, an identifier of an enhanced packet system (EPS) bearer corresponding to the bearer, an uplink RLC configuration and/or a downlink RLC configuration of the protocol entity RLC 22, a configuration of LCH 22, a configuration of MAC 2, and a configuration of PHY 2;

when the type information is type 2 and the direction information is downlink unidirectional, the first configuration is an identifier of the bearer, an identifier of an EPS bearer corresponding to the bearer, a downlink RLC configuration of the protocol entity RLC 22, a configuration of LCH 22, a configuration of MAC 2, and a configuration of PHY 2;

when the type information is type 2 and the direction indicated by the direction information is uplink unidirectional, the first configuration is an identifier of the bearer, an identifier of an EPS bearer corresponding to the bearer, an uplink RLC configuration of the protocol entity RLC 22, a configuration of LCH 22, a configuration of MAC 2, and a configuration of PHY 2;

when the type information is type 3 and the direction indicated by the direction information is bidirectional, the first configuration is an identifier of the bearer, an identifier of an EPS bearer corresponding to the bearer, a configuration of the protocol entity PDCP 3, an uplink RLC configuration and a downlink RLC configuration of RLC 3, a configuration of LCH 3, a configuration of MAC 2, and a configuration of PHY 2;

when the type information is type 3 and the direction indicated by the direction information is downlink unidirectional, the first configuration is an identifier of the bearer, an identifier of an EPS bearer corresponding to the bearer, a configuration of the protocol entity PDCP 3, a downlink RLC configuration of RLC 3, a configuration of LCH 3, a configuration of MAC 2, and a configuration of PHY 2; and when the type information is type 3 and the direction indicated by the direction information is uplink unidirectional, the first configuration is an identifier of the bearer, an identifier of an EPS bearer corresponding to the bearer, a configuration of the protocol entity PDCP 3, an uplink RLC configuration of RLC 3, a configuration of LCH 3, a configuration of MAC 2, and a configuration of PHY 2.

For another example, when the type information is type 2 and the direction indicated by the direction information is bidirectional, the first configuration is an identifier of the bearer, an identifier of an EPS bearer corresponding to the bearer, a configuration of the protocol entity PDCP 2, an uplink RLC configuration and a downlink RLC configuration of the protocol entity RLC 22, a configuration of LCH 22, a configuration of MAC 2, and a configuration of PHY 2;

when the type information is type 2 and the direction indicated by the direction information is downlink unidirectional, the first configuration is an identifier of the bearer, an identifier of an EPS bearer corresponding to the bearer, a configuration of the protocol entity PDCP 2, a downlink RLC configuration of RLC 22, a configuration of LCH 22, a configuration of MAC 2, and a configuration of PHY 2;

when the type information is type 2 and the direction indicated by the direction information is uplink unidirectional, the first configuration is an identifier of the bearer, an identifier of an EPS bearer corresponding to the bearer, a configuration of the protocol entity PDCP 2, an uplink RLC configuration of RLC 22, a configuration of LCH 22, a configuration of MAC 2, and a configuration of PHY 2;

when the type information is type 3 and the direction indicated by the direction information is bidirectional, the first configuration is an identifier of the bearer, an identifier of an EPS bearer corresponding to the bearer, a configuration of the protocol entity PDCP 3, an uplink RLC configuration and a downlink RLC configuration of RLC 3, a configuration of LCH 3, a configuration of MAC 2, and a configuration of PHY 2;

when the type information is type 3 and the direction indicated by the direction information is downlink unidirectional, the first configuration is an identifier of the bearer, an identifier of an EPS bearer corresponding to the bearer, a configuration of the protocol entity PDCP 3, a downlink RLC configuration of RLC 3, a configuration of LCH 3, a configuration of MAC 2, and a configuration of PHY 2; and when the type information is type 3 and the direction indicated by the direction information is uplink unidirectional, the first configuration is an identifier of the bearer, an identifier of an EPS bearer corresponding to the bearer, a configuration of the protocol entity PDCP 3, an uplink RLC configuration of RLC 3, a configuration of LCH 3, a configuration of MAC 2, and a configuration of PHY 2.

The generating unit 103 is configured to generate a second configuration for the bearer when it is determined that the type of the bearer is type 2.

Further, when it is determined that the type of the bearer is type 3, no second configuration is generated.

For example, the second configuration generated by the generating unit 103 may be at least one of an identifier of the bearer, an identifier of an EPS bearer corresponding to the bearer, a configuration of a first PDCP entity, a configuration of a first RLC entity, a configuration of a first LCH, a configuration of a first MAC entity, and a configuration of a first PHY entity, where the first PDCP entity, the first RLC entity, the first LCH, the first MAC entity, and the first PHY entity are all associated with the bearer.

For example, when the type of the bearer is type 2, the second configuration is an identifier of the bearer, an identifier of an EPS bearer corresponding to the bearer, a configuration of the protocol entity PDCP 2, an uplink RLC configuration and/or a downlink RLC configuration of RLC 21, a configuration of LCH 21, a configuration of MAC 1, and a configuration of PHY 1.

The sending unit 101 is further configured to: send the first configuration and the second configuration to the UE when it is determined that the type of the bearer is type 2, and send the first configuration to the UE when it is determined that the type of the bearer is type 3.

According to the first network device provided by this embodiment of the present invention, the first network device sends a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 3:
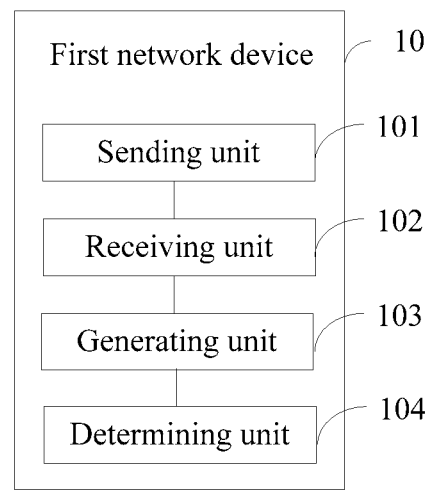
FIG. 3 is a schematic structural diagram of another embodiment of a first network device according to the present invention.

FIG. 3 is a schematic structural diagram of another embodiment of the first network device according to the present invention. As shown in FIG. 3, the first network device 10 further includes a determining unit 104.

The determining unit 104 is configured to determine type information of the bearer; or configured to determine direction information of the first configuration; or configured to determine type information of the bearer and direction information of the first configuration. The type information is used to indicate that the type of the bearer is type 2 or type 3, and the direction information is used to indicate that the direction of the first configuration is bidirectional, downlink unidirectional, or uplink unidirectional.

Further, a determining rule has been elaborated in the foregoing embodiment and is not repeatedly described herein.

The sending unit 101 may be configured to send a request message including the type information, or send a request message including the direction information, or configured to send a request message including the type information and the direction information.

Further, if the determining unit 104 determines the type information of the bearer, the sending unit 101 may send a request message including the type information; if the determining unit 104 determines the direction information of the bearer, the sending unit 101 may send a request message including the direction information; and if the determining unit 104 determines the type information and direction information of the bearer, the sending unit 101 may send a request message including the type information and the direction information.

For example, that, if the determining unit 104 determines the type information of the bearer, the sending unit 101 may send a request message including the type information, which may be as follows:

The receiving unit 102 may receive capability information sent by the UE, and the determining unit 104 may be configured to determine the type information according to the capability information of the UE, where the capability information indicates that a type of a bearer supported by the UE may be at least one of type 1, type 2, and type 3. If the UE has multiple bearers, some of the bearers may be configured as type-1 bearers, some bearers may be configured as type-2 bearers, and the rest of the bearers may be configured as type-3 bearers, that is, the UE may have type-1, type-2, and type-3 bearers at the same time. Alternatively, the UE has multiple bearers, where some of the bearers may be configured as type-1 bearers, and the rest of the bearers can only be configured as type-2 bearers or can only be configured as type-3 bearers.

For example, when one UE sends its capability information to the first network device, the first network device may determine a type of a radio bearer of the UE according to a bearer type supported by the UE. For example, when the first network device determines that the bearer is of type 2, the first network device may generate an identifier of the bearer, an identifier of an EPS bearer corresponding to the bearer, a configuration of protocol entity PDCP 2, a configuration of RLC 21, a configuration of MAC 1, and a configuration of PHY 1 to serve as the second configuration, and the first network device sends the foregoing determined capability information of the UE to the second network device, so that the second network device learns the type of the bearer according to the capability information of the UE:

if the capability information of the UE indicates that bearer types supported by the UE are type 1 and type 2, the second network device may learn that the bearer is of type 2, and therefore generates, for the type-2 bearer, an identifier of the bearer, an identifier of an EPS bearer corresponding to the bearer, a configuration of protocol entity RLC 22, a configuration of MAC 2, and a configuration of PHY 2 to serve as the first configuration, and sends the first configuration to the first network device, and then the first network device sends the first configuration and the second configuration to the UE; and if the capability information of the UE indicates that the bearer types supported by the UE are type 1 and type 3, the second network device may learn that the bearer is of type 3, and therefore the second network device may generate an identifier of the bearer, an identifier of an EPS bearer corresponding to the bearer, a configuration of protocol entity PDCP 3, a configuration of RLC 3, a configuration of MAC 2, and a configuration of PHY 2 to serve as the first configuration, and sends the first configuration to the first network device, and then the first network device sends the first configuration and the second configuration to the UE.

By default, the foregoing configuration generated according to the bearer type may be generated when the determining unit 104 determines that the direction information is bidirectional.

If the determining unit 104 is configured to determine the direction information of the bearer, the sending unit 101 may be configured to send a request message including the direction information, where the direction information may indicate that the direction is bidirectional, downlink unidirectional, or uplink unidirectional.

If the determining unit 104 is configured to determine the direction information and the type information of the bearer, the generating unit 103 generates the second configuration according to corresponding configurations listed above.

For example, when the first network device determines that the bearer is of type 2 and that the direction information is bidirectional, and enables the second network device to learn that the bearer is of type 2 and that the direction information is bidirectional, the first network device generates an identifier of the bearer, an identifier of an EPS bearer corresponding to the bearer, and a configuration of the protocol entity PDCP 2, an uplink unidirectional configuration and/or a downlink unidirectional configuration of RLC 21, a configuration of MAC 1, and a configuration of PHY 1 to serve as the second configuration, and the first network device sends a configuration direction indication to the second network device. The second network device generates, correspondingly according to the direction information indication and the type information of the bearer, a downlink unidirectional configuration and/or an uplink unidirectional configuration of the protocol entity RLC 22, a configuration of MAC 2, and a configuration of PHY 2 to serve as the first configuration, and sends the first configuration to the first network device, and the first network device sends, to the UE, the second configuration generated by the first network device and the first configuration generated by the second network device.

Further, when the first network device determines that the direction information is bidirectional, the second network device may generate a related uplink unidirectional configuration and a related downlink unidirectional configuration of RLC 22; when the direction of the direction information is downlink unidirectional, the second network device may generate a downlink-related configuration of RLC 22; and when the direction of the direction information is uplink unidirectional, the second network device may generate an uplink-related configuration of RLC 22.

When the first network device determines that the direction information is downlink unidirectional, the first network device generates an identifier of the bearer, an identifier of an EPS bearer corresponding to the bearer, and a configuration of the protocol entity PDCP 2, a downlink configuration of RLC 21, a configuration of MAC 1, and a configuration of PHY 1 to serve as the second configuration, and the first network device sends a configuration direction indication to the second network device, where the configuration direction indication is downlink unidirectional.

When the first network device determines that the direction indicated by the direction information is uplink unidirectional, the first network device generates a configuration of the protocol entity PDCP 2, an uplink configuration of RLC 21, a configuration of MAC 1, and a configuration of PHY 1, and the first network device sends a configuration direction indication to the second network device, where the configuration direction indication indicates that the direction is uplink unidirectional.

It should be noted that, when the bearer type supported by the UE is system default, the first network device and the second network device may also generate configurations according to a system default bearer type.

The receiving unit 102 may also receive capability information of the second network device to determine the type information, where the capability information of the second network device is used to indicate that a type of a bearer supported by the second network device is type 2 and/or type 3, and the capability information of the second network device is sent by the second network device or is system default.

For example, the first network device may also receive the capability information of the second network device sent by the second network device, where the capability information indicates a bearer type supported by the second network device, and the bearer type supported by the second network device may be any one or several of type 2 or type 3. If the second network device has multiple bearers, some of the bearers may be configured as type-2 bearers, and the rest of the bearers may be configured as type-3 bearers, that is, the second network device may have type-2 and type-3 bearers at the same time. Alternatively, the second network device has multiple bearers, and then the bearers can only be configured as type-2 bearers or can only be configured as type-3 bearers. The second network device cannot have type-2 bearers and type-3 bearers and the like at the same time.

For example, the first network device is an MeNB and the second network device is an SeNB, and then the MeNB may determine a type of one radio bearer of a UE according to capability information of the SeNB. When the MeNB determines that the bearer is of type 2, the MeNB generates an identifier of the bearer, an identifier of an EPS bearer corresponding to the bearer, a configuration of protocol entity PDCP 2, a configuration of RLC 21, a configuration of MAC 1, and a configuration of PHY 1, and the MeNB notifies the SeNB that the bearer is of type 2. According to this, the SeNB generates an identifier of the bearer, an identifier of an EPS bearer corresponding to the bearer, a configuration of protocol entity RLC 22, a configuration of MAC 2, and a configuration of PHY 2 to serve as a first configuration, and sends the first configuration to the MeNB. The MeNB sends, to the UE, a second configuration generated by the MeNB and the first configuration generated by the SeNB.

When the MeNB determines that the bearer is of type 3, the MeNB notifies the SeNB that the bearer is of type 3. The SeNB generates an identifier of the bearer, an identifier of an EPS bearer corresponding to the bearer, a configuration of the protocol entity PDCP 3, a configuration of RLC 3, a configuration of MAC 2, and a configuration of PHY 2 to serve as a first configuration, and sends the first configuration to the MeNB. The MeNB sends the first configuration generated by the SeNB to the UE, so that the UE receives the first configuration sent by the MeNB and uses the first configuration to configure protocol entities of the radio bearer.

It should be noted that, when the capability information of the second network device is system default, the first network device and the second network device may also generate configurations according to a system default bearer type corresponding to the capability information of the second network device.

By default, the foregoing configuration determined according to the capability information of the second network device may be generated when the determining unit 104 determines that the direction indicated by the direction information is bidirectional.

If the determining unit 104 is configured to determine the direction information of the bearer, the sending unit 101 may send a request message including the direction information, where the direction information may indicate that the direction is bidirectional, downlink unidirectional, or uplink unidirectional.

If the determining unit 104 is configured to determine the direction information and the type information of the bearer, the generating unit 103 generates the second configuration according to corresponding configurations listed above, and the second network device generates the first configuration corresponding to the direction information and the type information, which is not repeatedly described herein.

Further, after determining the type information, the first network device may notify the second network device in various manners.

For example, when the determining unit 104 determines that the type information of the bearer is type 2, the request message sent by the sending unit 101 includes the second configuration; and when the determining unit 104 determines that a type of the bearer is type 3, the request message sent by the sending unit 101 does not include the second configuration. In this way, when receiving the request message, the second network device may determine the type information according to whether the request message includes the second configuration; and determines that the type is type 2 if the second configuration is included, and determines that the type information is type 3 if the second configuration is not included.

Alternatively, the type information sent by the sending unit 101 is capability information of the UE, where the capability information of the UE is used to indicate that the type of the bearer supported by the UE is type 2 or type 3, and the capability information of the UE is sent by the UE.

Alternatively, the type information sent by the sending unit 101 is a first tunnel endpoint identifier or a second tunnel endpoint identifier, where the first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW. When the determining unit 104 determines that the type of the bearer is type 2, the type information sent by the sending unit 101 is the first tunnel endpoint identifier; and when the determining unit 104 determines that the type of the bearer is type 3, the type information sent by the sending unit 101 is the second tunnel endpoint identifier.

Further, the first network device is an MeNB, and the second network device is an SeNB. The first tunnel endpoint identifier is a GPRS Tunneling Protocol-User plane (GTP-U) tunnel endpoint allocated by the MeNB to a type-2 bearer, the tunnel endpoint may be recorded as an MeNB TEID, and the SeNB may use the MeNB TED to forward data of the bearer to the MeNB.

The second tunnel endpoint identifier is a GTP-U tunnel endpoint allocated by the serving gateway (SGW) to a type-3 bearer, the tunnel endpoint may be recorded as an SGW TEID, and the SeNB uses the SGW TED to forward data of the bearer to the SGW.

Further, as described in the foregoing examples, the request message sent by the sending unit 101 may include the direction information. For example, the direction information is quality of service (QoS) of the bearer. When the determining unit 104 determines that the direction of the first configuration is bidirectional, the QoS sent by the sending unit 101 includes uplink QoS and downlink QoS; when the determining unit 104 determines that the direction of the first configuration is uplink unidirectional, the QoS sent by the sending unit 101 includes only uplink QoS; and when the determining unit 104 determines that the direction of the first configuration is downlink unidirectional, the QoS sent by the sending unit 101 includes only downlink QoS. In this way, the second network device can determine the direction of the first configuration according to the received direction information, and correspondingly determine a direction of the second configuration generated by the second network device.

Further, the receiving unit 102 is further configured to receive a configuration completion message sent by the UE, after the sending unit 101 sends the first configuration, or the second configuration, or the first configuration and the second configuration to the UE, so as to determine that the UE has completed a configuration update operation according to the sent configuration(s). The sending unit 101 is further configured to send an acknowledgment message to the second network device, where the acknowledgment message is used to enable the second network device to confirm that the UE has used the first configuration.

According to the first network device provided by this embodiment of the present invention, the first network device sends a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 4:
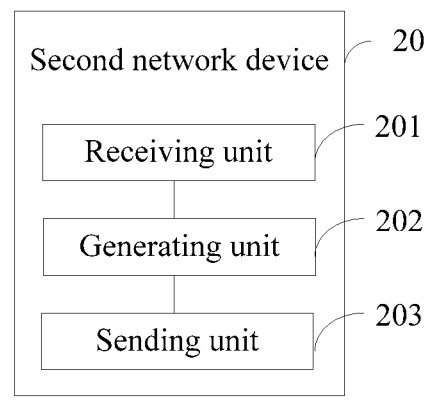
FIG. 4 is a schematic structural diagram of an embodiment of a second network device according to the present invention.

FIG. 4 is a schematic structural diagram of an embodiment of a second network device according to the present invention. As shown in FIG. 4, a second network device 20 includes a receiving unit 201, a generating unit 202, and a sending unit 203.

The receiving unit 201 is configured to receive a request message sent by a first network device, where the request message is used to generate a first configuration for a bearer of a user equipment UE, and a type of the bearer is type 2 or type 3, where a type-2 bearer is served by the first network device and the second network device, and a type-3 bearer is served only by the second network device.

It should be noted that, the request message includes one or two of type information of the bearer or direction information of the first configuration, where the type information is used to indicate that the type of the bearer is type 2 or type 3, and the direction information is used to indicate that a direction of the first configuration is bidirectional, downlink unidirectional, or uplink unidirectional.

The generating unit 202 is configured to generate the first configuration for the bearer of the user equipment UE according to the request message.

For example, when the type information of the bearer is type 2 and the direction information is bidirectional, the first configuration is an identifier of the bearer, an identifier of an EPS bearer corresponding to the bearer, a downlink unidirectional configuration of the protocol entity RLC 22, a configuration of MAC 2, and a configuration of PHY 2; or the first configuration is an identifier of the bearer, an identifier of an EPS bearer corresponding to the bearer, an uplink unidirectional configuration of the protocol entity RLC 22, a configuration of MAC 2, and a configuration of PHY 2; or the first configuration is an identifier of the bearer, an identifier of an EPS bearer corresponding to the bearer, an uplink unidirectional configuration and a downlink unidirectional configuration of the protocol entity RLC 22, a configuration of MAC 2, and a configuration of PHY 2.

When the type information of the bearer is type 2 and the direction indicated by the direction information is downlink unidirectional, the first configuration is an identifier of the bearer, an identifier of an EPS bearer corresponding to the bearer, a downlink configuration of the protocol entity RLC 22, a configuration of MAC 2, and a configuration of PHY 2.

When the type information of the bearer is type 2 and the direction indicated by the direction information is uplink unidirectional, the first configuration is an identifier of the bearer, an identifier of an EPS bearer corresponding to the bearer, an uplink configuration of the protocol entity RLC 22, a configuration of MAC 2, and a configuration of PHY 2.

When the type information of the bearer is type 3 and the direction indicated by the direction information is bidirectional, the first configuration is an identifier of the bearer, an identifier of an EPS bearer corresponding to the bearer, a configuration of the protocol entity PDCP 3, an uplink configuration of RLC 3, a configuration of MAC 2, and a configuration of PHY 2.

When the type information of the bearer is type 3 and the direction indicated by the direction information is downlink unidirectional, the first configuration is an identifier of the bearer, an identifier of an EPS bearer corresponding to the bearer, a configuration of the protocol entity PDCP 3, a downlink configuration of RLC 3, a configuration of MAC 2, a configuration of and PHY 2.

When the type information of the bearer is type 3 and the direction indicated by the direction information is uplink unidirectional, the first configuration is an identifier of the bearer, an identifier of an EPS bearer corresponding to the bearer, a configuration of the protocol entity PDCP 3, an uplink configuration of RLC 3, a configuration of MAC 2, and a configuration of PHY 2.

For another example, when the type information of the bearer is type 2 and the direction indicated by the direction information is bidirectional, the first configuration is an identifier of the bearer, an identifier of an EPS bearer corresponding to the bearer, a configuration of the protocol entity PDCP 2, a downlink unidirectional configuration of the protocol entity RLC 22, a configuration of MAC 2, and a configuration of PHY 2; or the first configuration is an identifier of the bearer, an identifier of an EPS bearer corresponding to the bearer, a configuration of the protocol entity PDCP 2, an uplink unidirectional configuration of the protocol entity RLC 22, a configuration of MAC 2, and a configuration of PHY 2; or the first configuration is an identifier of the bearer, an identifier of an EPS bearer corresponding to the bearer, a configuration of the protocol entity PDCP 2, an uplink unidirectional configuration and a downlink unidirectional configuration of the protocol entity RLC 22, a configuration of MAC 2, and a configuration of PHY 2.

When the type information of the bearer is type 2 and the direction indicated by the direction information is downlink unidirectional, the first configuration is an identifier of the bearer, an identifier of an EPS bearer corresponding to the bearer, a downlink configuration of the protocol entity RLC 21, a configuration of MAC 1, and a configuration of PHY 1.

When the type information of the bearer is type 2 and the direction indicated by the direction information is uplink unidirectional, the first configuration is an identifier of the bearer, an identifier of an EPS bearer corresponding to the bearer, a configuration of the protocol entity PDCP 2, an uplink configuration of RLC 22, a configuration of MAC 2, and a configuration of PHY 2.

When the type information of the bearer is type 3 and the direction indicated by the direction information is bidirectional, the first configuration is an identifier of the bearer, an identifier of an EPS bearer corresponding to the bearer, and a configuration of the protocol entity PDCP 3, an uplink configuration and a downlink configuration of RLC 3, a configuration of MAC 2, and a configuration of PHY 2.

When the type information of the bearer is type 3 and the direction indicated by the direction information is downlink unidirectional, the first configuration is an identifier of the bearer, an identifier of an EPS bearer corresponding to the bearer, a configuration of the protocol entity PDCP 3, a downlink configuration of RLC 3, a configuration of MAC 2, and a configuration of PHY 2.

When the type information of the bearer is type 3 and the direction indicated by the direction information is uplink unidirectional, the first configuration is an identifier of the bearer, an identifier of an EPS bearer corresponding to the bearer, a configuration of the protocol entity PDCP 3, an uplink configuration of RLC 3, a configuration of MAC 2, and a configuration of PHY 2.

Alternatively, for example, when the determining unit 204 determines that the type of the bearer is type 3, the first configuration generated by the generating unit 202 includes a configuration of a second PDCP entity, where the second PDCP entity is associated with the bearer; and when the determining unit 204 determines that the type of the bearer is type 2, the first configuration generated by the generating unit 202 does not include a configuration of a second PDCP entity.

Further, the first configuration generated by the generating unit 202 further includes at least one of an identifier of the bearer, an identifier of an EPS bearer corresponding to the bearer, a configuration of a second RLC entity, a configuration of a second LCH, a configuration of a second MAC entity, and a configuration of a second PHY entity, where the second RLC entity, the second LCH, the second MAC entity, and the second PHY entity are associated with the bearer.

The sending unit 203 is configured to send the first configuration to the first network device, so that the first network device sends the first configuration to the UE.

According to the second network device provided by this embodiment of the present invention, a first network device sends a request message to the second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 5:
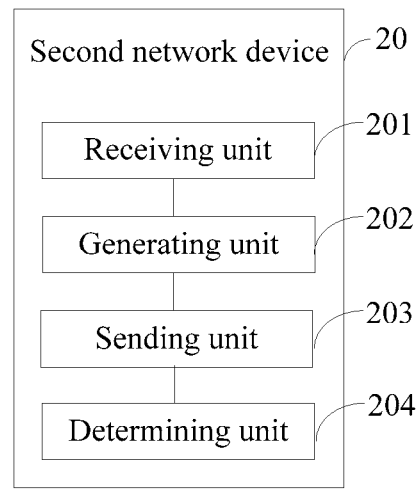
FIG. 5 is a schematic structural diagram of another embodiment of a second network device according to the present invention.

FIG. 5 is a schematic structural diagram of another embodiment of the second network device according to the present invention. As shown in FIG. 5, the first network device 20 further includes a determining unit 204.

The determining unit 204 is configured to determine, according to the type information, that the type of the bearer is type 2 or type 3, and/or configured to determine, according to the direction information, that the direction of the first configuration is bidirectional, downlink unidirectional, or uplink unidirectional.

The generating unit 202 is further configured to: if the determining unit 204 is configured to determine, according to the type information, that the type of the bearer is type 2 or type 3, generate the first configuration for the bearer according to the type of the bearer; if the determining unit 204 is configured to determine, according to the direction information, that the direction of the first configuration is bidirectional, downlink unidirectional, or uplink unidirectional, generate the first configuration for the bearer according to the direction of the first configuration; and if the determining unit 204 is configured to determine, according to the type information, that the type of the bearer is type 2 or type 3 and determine, according to the direction information, that the direction of the first configuration is bidirectional, downlink unidirectional, or uplink unidirectional, generate the first configuration for the bearer according to the type of the bearer and the direction of the first configuration.

Further, the first configuration generated by the generating unit 202 includes a configuration of a second RLC entity, where the second RLC entity is associated with the bearer.

When the determining unit 204 determines that the direction of the first configuration is bidirectional, the configuration of the second RLC entity includes an RLC uplink configuration and an RLC downlink configuration;

when the determining unit 204 determines that the direction of the first configuration is downlink unidirectional, the configuration of the second RLC entity includes only an RLC downlink configuration; and when the determining unit 204 determines that the direction of the first configuration is uplink unidirectional, the configuration of the second RLC entity includes only an RLC uplink configuration.

For example, the first network device is an MeNB, the second network device is an SeNB, and the SeNB sends its capability information to the MeNB, where the capability information indicates a bearer type supported by the SeNB. The bearer type supported by the SeNB may be type 2 or type 3, and the capability information may be that only type 2 or type 3 is supported, the capability information may also be that type 2 and type 3 are supported at the same time, or the capability information may also be that type 2 and type 3 are not supported at the same time. That the capability information may also be that type 2 and type 3 are supported at the same time is mainly that, if the SeNB has multiple bearers, some of the bearers may be configured as type-2 bearers, and the rest of the bearers may be configured as type-3 bearers. That the capability information may also be that type 2 and type 3 are not supported at the same time is that, if the SeNB has multiple bearers, these bearers can only be configured only as type-2 bearers or can only be configured all as type-3 bearers.

The SeNB generates the first configuration according to a bearer type determined by the MeNB. If the MeNB determines that the bearer is of type 2, the MeNB notifies the SeNB that the bearer is of type 2, and the first configuration generated by the SeNB is an identifier of the bearer, an identifier of an EPS bearer corresponding to the bearer, a configuration of protocol entity RLC 22, a configuration of MAC 2, and a configuration of PHY 2. If the MeNB determines that the bearer is of type 3, the MeNB notifies the SeNB that the bearer is of type 3, and the first configuration generated by the SeNB is an identifier of the bearer, an identifier of an EPS bearer corresponding to the bearer, a configuration of protocol entity PDCP 3, a configuration of RLC 3, a configuration of MAC 2, and a configuration of PHY 2.

It should be noted that, if the bearer type supported by the SeNB is system default, the MeNB may determine the bearer type supported by the SeNB according to a system default, and in this case, the SeNB may not send its capability information to the MeNB. In the foregoing example, the SeNB considers by default that bearers of a UE are all bidirectional, and with reference to this, uplink unidirectional and downlink unidirectional bearers may be analogized. Details are not repeatedly described herein.

For another example, one UE sends its capability information to a first network device, and the first network device may determine a type of a radio bearer of the UE according to a bearer type supported by the UE. For example, the first network device is an MeNB, and the second network device is an SeNB. For the bearer type supported by the UE, the bearer type supported by the UE may be at least one of type 1, type 2, or type 3. Because a second configuration generated for type 1 belongs to the prior art, type 1 is not elaborated herein. The MeNB determines type information and direction information according to a type that can be borne by the UE. For example, when the MeNB determines that the bearer is of type 2 and that the direction information is bidirectional, the MeNB notifies the SeNB that the type information is type 2, and the direction information indicates that the direction is bidirectional. A notification method has been elaborated in the foregoing embodiment and is not repeatedly described herein.

For example, when the MeNB determines that the bearer is of type and that the direction information indicates that the direction is bidirectional, the MeNB notifies the SeNB to learn that the bearer is of type 2 and that the direction indicated by the direction information is bidirectional, and then sends a configuration direction indication to the SeNB, and the SeNB generates, according to the configuration direction indication and the type 2 of the bearer, a downlink configuration and/or an uplink configuration of the protocol entity RLC 22, a configuration of MAC 2, and a configuration of PHY 2 to serve as the first configuration.

Further, a configuration direction may be sent to indicate a direction. For example, when the configuration direction indication is bidirectional, the SeNB may generate an uplink-related configuration and a downlink-related configuration of RLC 22; when the configuration direction indication is downlink unidirectional, the SeNB may generate a downlink-related configuration of RLC 22; and when the configuration direction indication is uplink unidirectional, the SeNB may generate an uplink-related configuration of RLC 22.

When the first network device determines that the bearer is of type 2 and that the direction indicated by the direction information is downlink unidirectional, the first network device notifies the SeNB to learn that the bearer is of type 2 and that the direction indicated by the direction information is downlink unidirectional, and the SeNB generates, according to the configuration direction indication and the type of the bearer, a downlink configuration of the protocol entity RLC 22, a configuration of MAC 2, and a configuration of PHY 2 to serve as the first configuration.

When the first network device determines that the bearer is of type 2 and that the direction indicated by the direction information is uplink unidirectional, the first network device notifies the SeNB to learn that the bearer is of type 2 and that the direction indicated by the direction information is uplink unidirectional, and the SeNB generates, according to the configuration direction indication and the type of the bearer, an uplink configuration of the protocol entity RLC 22, a configuration of MAC 2, and a configuration of PHY 2 to serve as the first configuration.

For example, when the MeNB determines that the bearer is of type 3 and that the direction indicated by the direction information is bidirectional, the MeNB notifies the SeNB to learn that the bearer is of type 3 and that the direction indicated by the direction information is bidirectional, and the SeNB generates, according to the configuration direction indication and the type of the bearer, a configuration of the protocol entity PDCP 3, an uplink configuration and a downlink configuration of RLC 3, a configuration of MAC 2, and a configuration of PHY 2 to serve as the first configuration.

When the MeNB determines that the bearer is of type 3 and that the direction indicated by the direction information is downlink unidirectional, the MeNB notifies the SeNB to learn that the bearer is of type 3 and that the direction indicated by the direction information is downlink unidirectional, and the SeNB generates, according to the configuration direction indication and the type of the bearer, a configuration of the protocol entity PDCP 3, a downlink configuration of RLC 3, a configuration of MAC 2, and a configuration of PHY 2 to serve as the first configuration.

When the MeNB determines that the bearer is of type 3 and that the direction indicated by the direction information is uplink unidirectional, the MeNB notifies the SeNB to learn that the bearer is of type 3 and that the direction indicated by the direction information is uplink unidirectional, and the SeNB generates, according to the configuration direction indication and the type of the bearer, a configuration of the protocol entity PDCP 3, an uplink configuration of RLC 3, a configuration of MAC 2, and a configuration of PHY 2 to serve as the first configuration.

It should be noted that, if the bearer type supported by the UE is system default, the MeNB may determine the bearer type supported by the UE according to a system default bearer type and according to this, determines the type information. In this case, the UE may not send its capability information to the MeNB.

It should be noted that the request message includes or does not include a second configuration generated by the first network device for the bearer, where the second configuration is at least one of an identifier of the bearer, an identifier of an EPS bearer corresponding to the bearer, a configuration of a first PDCP entity, a configuration of a first RLC entity, a configuration of a first LCH, a configuration of a first MAC entity, and a configuration of a first PHY entity, where the first PDCP entity, the first RLC entity, the first LCH, the first MAC entity, and the first PHY entity are all associated with the bearer. When the request message received by the receiving unit 201 includes the second configuration, the determining unit 204 determines that the type of the bearer is type 2.

When the request message received by the receiving unit 201 does not include the second configuration, the determining unit 204 determines that the type of the bearer is type 3.

For example, the first network device is an MeNB, and the second network device is an SeNB. When the MeNB determines that the bearer is of type 2, the MeNB generates a configuration of protocol entity PDCP 2, a configuration of RLC 21, a configuration of MAC 1, and a configuration of PHY 1 to serve as the second configuration; the MeNB sends all or part of the second configuration to the SeNB. For example, a flag may be used to indicate that the second configuration is generated by the MeNB, and the SeNB is so notified, and according to this, the SeNB determines that the bearer is of type 2; therefore the SeNB generates a configuration of protocol entity RLC 22, a configuration of MAC 2, and a configuration of PHY 2 to serve as the first configuration, and sends the first configuration to the MeNB.

It should be noted that the second RLC entity may be recorded as RLC 22, and the configuration of RLC 22 is generated by the SeNB; and the configuration of the first RLC entity may be recorded as RLC 21, and the configuration of RLC 21 is generated by the MeNB.

When the MeNB determines that the bearer is of type 3, the MeNB neither generates a configuration by itself nor sends a configuration to the SeNB, and according to this, the SeNB determines that the bearer is of type 3, and therefore the SeNB generates a configuration of protocol entity PDCP 3, a configuration of RLC 3, a configuration of MAC 2, and a configuration of PHY 2 to serve as the first configuration, and sends the first configuration to the MeNB. The MeNB sends the first configuration generated by the SeNB to the UE, or the SeNB directly sends the first configuration to the UE.

In the foregoing example, the SeNB considers by default that bearers of the UE are all bidirectional, and with reference to this, uplink unidirectional and downlink unidirectional bearers may be analogized. Details are not repeatedly described herein.

Alternatively, for example, the type information received by the receiving unit 201 is capability information of the UE, where the capability information of the UE is used to indicate a type of a bearer supported by the UE. For example, when the capability information of the UE received by the receiving unit 21 indicates that the type of the bearer supported by the UE is type 2, the determining unit 204 determines that the type of the bearer is type 2; and when the capability information of the UE received by the receiving unit 201 indicates that the type of the bearer supported by the UE is type 3, the determining unit 204 determines that the type of the bearer is type 3.

For example, the first network device is an MeNB, the second network device is an SeNB, and one UE sends its capability information to the MeNB, where the capability information indicates a bearer type supported by the UE. Bearer types supported by the UE have been listed in the foregoing embodiment and are not repeatedly described herein. When the MeNB determines that the bearer is of type 2, the MeNB sends the foregoing capability information of the UE to the SeNB, and the SeNB learns the type of the bearer according to the capability information of the UE. For example, when the capability information of the UE indicates that the bearer types supported by the UE are type 1 and type 2, the SeNB learns that the bearer is of type 2, and therefore the SeNB generates a configuration of protocol entity RLC 22, a configuration of MAC 2, and a configuration of PHY 2 to serve as the first configuration; and when the capability information of the UE indicates that the bearer types supported by the UE are type 1 and type 3, the SeNB learns that the bearer is of type 3, and therefore the SeNB generates a configuration of protocol entity PDCP 3, a configuration of RLC 3, a configuration of MAC 2, and a configuration of PHY 2 to serve as the first configuration.

It should be noted that, when the bearer type supported by the UE is system default, the first network device and the second network device may generate configurations according to a system default bearer type.

Alternatively, for example, the type information received by the receiving unit 201 is a first tunnel endpoint identifier or a second tunnel endpoint identifier, where the first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW.

When the request message received by the receiving unit 201 includes the first tunnel endpoint identifier, the determining unit 204 determines that the type of the bearer is type 2; and when the request message received by the receiving unit 201 includes the second tunnel endpoint identifier, the determining unit 204 determines that the type of the bearer is type 3.

Further, when an MeNB determines that the bearer is of type 2, the MeNB sends an MeNB TEID to an SeNB, and according to this, the SeNB determines that the bearer is of type 2, and therefore the SeNB generates a configuration of protocol entity RLC 22, a configuration of MAC 2, and a configuration of PHY 2 to serve as the first configuration.

When the MeNB determines that the bearer is of type 3, the MeNB sends an SGW TEID to an SeNB, and according to this, the SeNB determines that the bearer is of type 3, and therefore the SeNB generates a configuration of protocol entity PDCP 3, a configuration of RLC 3, a configuration of MAC 2, and a configuration of PHY 2 to serve as the first configuration.

Further, the direction information in the request message received by the receiving unit 201 may be QoS of the bearer, where the QoS includes downlink QoS, or uplink QoS, or downlink QoS and uplink QoS, of the bearer. The downlink QoS includes a QoS class identifier (QCI), an allocation and retention priority (Allocation and Retention Priority, ARP), a maximum bit rate (MBR), a guaranteed bit rate (GBR), an aggregate maximum bit rate (AMBR), and the like of downlink user data of the bearer; and the uplink QoS includes a QIC, an ARP, an MRB, a GBR, an AMBR, and the like of uplink user data of the bearer.

If the QoS received by the receiving unit 201 includes uplink QoS and downlink QoS, the determining unit 204 determines that the direction of the first configuration is bidirectional; if the QoS received by the receiving unit 201 includes only uplink QoS, the determining unit 204 determines that the direction of the first configuration is uplink unidirectional; and if the QoS received by the receiving unit 201 includes only downlink QoS, the determining unit 204 determines that the direction of the first configuration is downlink unidirectional.

Further, the receiving unit 201 is further configured to receive an acknowledgment message sent by the first network device, where the acknowledgment message is used to confirm that the UE has used the first configuration; and the determining unit 204 is further configured to confirm that the UE has used the first configuration.

According to the second network device provided by this embodiment of the present invention, a first network device sends a request message to the second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 6:
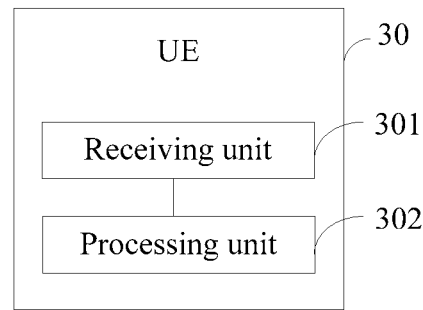
FIG. 6 is a schematic structural diagram of an embodiment of a UE according to the present invention.

FIG. 6 is a schematic structural diagram of an embodiment of a UE according to the present invention. As shown in FIG. 6, a UE 30 includes a receiving unit 301 and a processing unit 302.

The receiving unit 301 is configured to receive a first configuration and a second configuration that are sent by a first network device, or configured to receive a first configuration sent by a first network device, where the first configuration is generated by a second network device and is sent by the second network device to the first network device, and the second configuration is generated by the first network device.

The receiving unit 301 is specifically configured to receive the first configuration and the second configuration that are sent by the first network device, where the second configuration includes at least one of an identifier of a bearer, an identifier of an EPS bearer corresponding to the bearer, a configuration of a first PDCP entity, a configuration of a first RLC entity, a configuration of a first LCH, a configuration of a first MAC entity, and a configuration of a first PHY entity, and the first configuration includes at least one of the identifier of the bearer, the identifier of the EPS bearer corresponding to the bearer, a configuration of a second RLC entity, a configuration of a second LCH, a configuration of a second MAC entity, and a configuration of a second PHY entity, where the first PDCP entity, the first RLC entity, the first LCH, the first MAC entity, the first PHY entity, the second RLC entity, the second LCH, the second MAC entity, and the second PHY entity are associated with the bearer, and the configuration of the second RLC entity includes an RLC uplink configuration and/or an RLC downlink configuration.

For example, the receiving unit 301 is configured to receive the first configuration sent by the first network device, where the first configuration includes at least one of an identifier of a bearer, an identifier of an EPS bearer corresponding to the bearer, a configuration of a second PDCP entity, a configuration of a second RLC entity, a configuration of a second LCH, a configuration of a second MAC entity, and a configuration of a second PHY entity, where the second PDCP entity, the second RLC entity, the second LCH, the second MAC entity, and the second PHY entity are associated with the bearer, and the configuration of the second RLC entity includes an RLC uplink configuration and/or an RLC downlink configuration.

The processing unit 302 is configured to configure the bearer according to the first configuration and the second configuration that are received by the receiving unit 301, or configured to configure the bearer according to the first configuration received by the receiving unit 301.

For example, the first network device is an MeNB, and the receiving unit 301 of the UE receives a configuration sent by the MeNB and uses the received configuration to configure protocol entities of the bearer.

Specifically, an operation of configuring the bearer by the processing unit 302 according to the first configuration and the second configuration that are received by the receiving unit 301 may be:

establishing the first PDCP entity, the first RLC entity, and the first LCH respectively according to the configuration of the first PDCP entity, the configuration of the first RLC entity, and the configuration of the first LCH, establishing the second RLC entity and the second LCH respectively according to the configuration of the second RLC entity and the configuration of the second LCH, and indicating to a NAS that the bearer has been established and the identifier of the EPS bearer; or releasing the first PDCP entity, the first RLC entity, and the first LCH, and establishing a second PDCP entity, the second RLC entity, and the second LCH respectively according to a configuration of the second PDCP entity, the configuration of the second RLC entity, and the configuration of the second LCH; or modifying the first PDCP entity, the first RLC entity, or the first LCH respectively according to the configuration of the first PDCP entity, the configuration of the first RLC entity, or the configuration of the first LCH, and establishing the second RLC entity and the second LCH respectively according to the configuration of the second RLC entity and the configuration of the second LCH; or releasing a second PDCP entity, the second RLC entity, and the second LCH, and newly establishing the first PDCP entity, the first RLC entity, and the first LCH respectively according to the configuration of the first PDCP entity, the configuration of the first RLC entity, and the configuration of the first LCH; or releasing a second PDCP entity, the second RLC entity, and the second LCH, establishing the first PDCP entity, the first RLC entity, and the first LCH respectively according to the configuration of the first PDCP entity, the configuration of the first RLC entity, and the configuration of the first LCH, and establishing the second RLC entity and the second LCH respectively according to the configuration of the second RLC entity and the configuration of the second LCH; or releasing the first PDCP entity, the first RLC entity, and the first LCH, releasing the second RLC entity and the second LCH, and indicating to a NAS that the bearer has been released and the identifier of the EPS bearer; or releasing the second RLC entity and the second LCH, and modifying the first PDCP entity, the first RLC entity, or the first LCH respectively according to the configuration of the first PDCP entity, the configuration of the first RLC entity, or the configuration of the first LCH; or releasing the first PDCP entity, the first RLC entity, and the first LCH, releasing the second RLC entity and the second LCH, and establishing a second PDCP entity, the second RLC entity, and the second LCH respectively according to a configuration of the second PDCP entity, the configuration of the second RLC entity, and the configuration of the second LCH; or modifying the first PDCP entity, the first RLC entity, the first LCH, the second RLC entity, or the second LCH respectively according to the configuration of the first PDCP entity, the configuration of the first RLC entity, the configuration of the first LCH, the configuration of the second RLC entity, or the configuration of the second LCH; or establishing or modifying the first MAC entity according to the configuration of the first MAC entity; or releasing the first MAC entity; or establishing or modifying the first PHY entity according to the configuration of the first PHY entity; or releasing the first PHY entity; or establishing or modifying the second MAC entity according to the configuration of the second MAC entity; or releasing the second MAC entity; or establishing or modifying the second PHY entity according to the configuration of the second PHY entity; or releasing the second PHY entity.

The processing unit 302 may determine, according to configurations and/or indication information specifically included in the first configuration and the second configuration, that at least one of the foregoing specific operations needs to be executed.

Specifically, an operation of configuring the bearer by the processing unit 302 according to the first configuration received by the receiving unit 301 may be:

establishing the second PDCP entity, the second RLC entity, and the second LCH respectively according to the configuration of the second PDCP entity, the configuration of the second RLC entity, and the configuration of the second LCH, and indicating to a NAS that the bearer has been established and the identifier of the EPS bearer; or modifying the second PDCP entity, the second RLC entity, or the second LCH respectively according to the configuration of the second PDCP entity, the configuration of the second RLC entity, or the configuration of the second LCH; or releasing the second PDCP entity, the second RLC entity, and the second LCH, and indicating to a NAS that the bearer has been released and the identifier of the EPS bearer; or establishing or modifying the second MAC entity according to the configuration of the second MAC entity; or releasing the second MAC entity; or establishing or modifying the second PHY entity according to the configuration of the second PHY entity; or releasing the second PHY entity.

The processing unit 302 may determine, according to a configuration and/or indication information specifically included in the first configuration, that at least one of the foregoing specific operations needs to be executed.

According to the UE provided by this embodiment of the present invention, a first network device sends a request message to a second network device, where the request message is used to enable the second network device to generate a first configuration for a bearer of the user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 7:
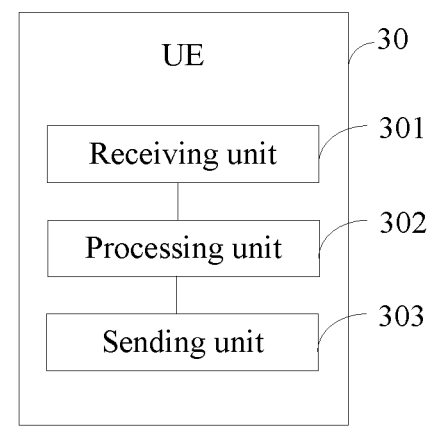
FIG. 7 is a schematic structural diagram of another embodiment of a UE according to the present invention.

FIG. 7 is a schematic structural diagram of another embodiment of the UE according to the present invention. As shown in FIG. 7, the UE 30 further includes a sending unit 303.

The sending unit 303 is configured to send capability information of the UE to the first network device, where the capability information of the UE is used to indicate that a type of a bearer supported by the UE is type 2 and/or type 3, a type-2 bearer is served by the first network device and the second network device, and a type-3 bearer is served only by the second network device.

It should be noted that, types that can be borne by the UE have been elaborated in the foregoing embodiment and is not repeatedly described herein. If a bearer type supported by the UE is system default, the UE may also not send the capability information of the UE to the first network device.

Further, the sending unit 303 sends a configuration completion message to the first network device after the processing unit 302 configures the bearer, so that the first network device confirms that the UE has used the first configuration and the second configuration or has used the first configuration.

According to the UE provided by this embodiment of the present invention, a first network device sends a request message to a second network device, where the request message is used to enable the second network device to generate a first configuration for a bearer of the user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 8:
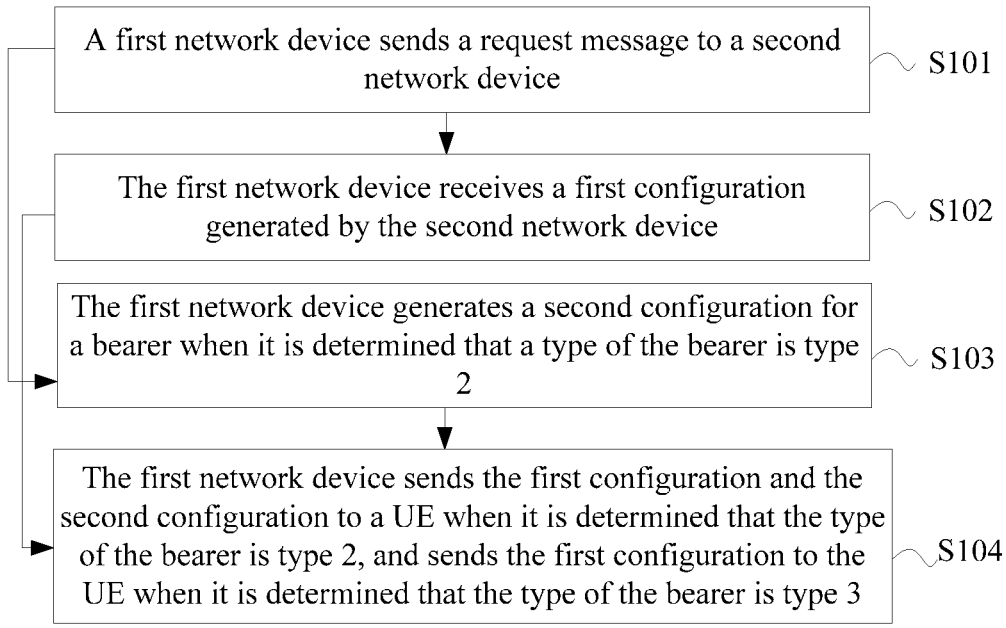
FIG. 8 is a schematic flowchart of an embodiment of a radio bearer configuration method according to the present invention.

FIG. 8 is a schematic flowchart of an embodiment of a radio bearer configuration method according to the present invention. As shown in FIG. 8, the method includes:

S101. A first network device sends a request message to a second network device.

It should be noted that, the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device.

Before sending the request message to the second network device, the first network device may determine type information of the bearer and/or direction information of the first configuration first, where the type information is used to indicate that the type of the bearer is type 2 or type 3, and the direction information is used to indicate that a direction of the first configuration is bidirectional, downlink unidirectional, or uplink unidirectional. In this case, the request message sent to the second network device may be a request message including the type information and/or the direction information.

For example, the first network device may determine the type information according to capability information of the UE and/or capability information of the second network device, where the capability information of the UE is used to indicate that a type of a bearer supported by the UE is type 2 and/or type 3, and the capability information of the second network device is used to indicate that a type of a bearer supported by the second network device is type 2 and/or type 3, the capability information of the UE is sent by the UE to the first network device or is predetermined in a system, and the capability information of the second network device is sent by the second network device to the first network device or is predetermined in a system.

For another example, the first network device may determine first whether the second network device sends and receives user data of the bearer, or only sends user data of the bearer, or only receives user data of the bearer. If the first network device determines that the second network device sends and receives user data of the bearer, the first network device determines that the direction information is bidirectional; if the first network device determines that the second network device only sends user data of the bearer, the first network device determines that the direction information is downlink unidirectional; and if the first network device determines that the second network device only receives user data of the bearer, the first network device determines that the direction information is uplink unidirectional.

S102. The first network device receives a first configuration generated by the second network device.

It should be noted that specific content of the first configuration has been elaborated in the foregoing embodiment and is not repeatedly described herein.

S103. The first network device generates a second configuration for a bearer when it is determined that a type of the bearer is type 2.

For example, the second configuration may be at least one of an identifier of the bearer, an identifier of an EPS bearer corresponding to the bearer, a configuration of a first PDCP entity, a configuration of a first RLC entity, a configuration of a first LCH, a configuration of a first MAC entity, and a configuration of a first PHY entity, where the first PDCP entity, the first RLC entity, the first LCH, the first MAC entity, and the first PHY entity are all associated with the bearer.

It should be noted that S102 and S103 may be in any ordinal relationship.

S104. The first network device sends the first configuration and the second configuration to a UE when it is determined that the type of the bearer is type 2, and sends the first configuration to the UE when it is determined that the type of the bearer is type 3.

According to the radio bearer configuration method provided by this embodiment of the present invention, a first network device sends a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 9:
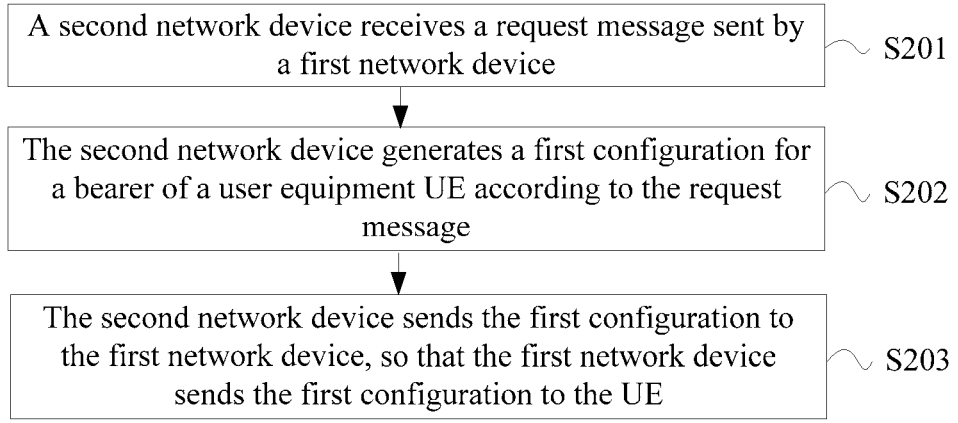
FIG. 9 is a schematic flowchart of another embodiment of a radio bearer configuration method according to the present invention.

FIG. 9 is a schematic flowchart of another embodiment of a radio bearer configuration method according to the present invention. As shown in FIG. 9, the method includes:

S201. A second network device receives a request message sent by a first network device.

It should be noted that, the request message is used to generate a first configuration for a bearer of a user equipment UE, and a type of the bearer is type 2 or type 3, where a type-2 bearer is served by the first network device and the second network device, and a type-3 bearer is served only by the second network device. Further, the request message may include type information of the bearer and/or direction information of the first configuration, where the type information is used to indicate that the type of the bearer is type 2 or type 3, and the direction information is used to indicate that a direction of the first configuration is bidirectional, downlink unidirectional, or uplink unidirectional.

S202. The second network device generates a first configuration for a bearer of a user equipment UE according to the request message.

For example, the second network device determines, according to the type information, that the type of the bearer is type 2 or type 3, and/or is configured to determine, according to the direction information, that the direction of the first configuration is bidirectional, downlink unidirectional, or uplink unidirectional. The first configuration is generated for the bearer according to the type of the bearer if it is determined, according to the type information, that the type of the bearer is type 2 or type 3; the first configuration is generated for the bearer according to the direction of the first configuration if it is determined, according to the direction information, that the direction of the first configuration is bidirectional, downlink unidirectional, or uplink unidirectional; and the first configuration is generated for the bearer according to the type of the bearer and the direction of the first configuration if it is determined, according to the type information, that the type of the bearer is type 2 or type 3 and it is determined, according to the direction information, that the direction of the first configuration is bidirectional, downlink unidirectional, or uplink unidirectional.

Further, when the second network device determines that the type of the bearer is type 3, the generated first configuration includes a configuration of a second PDCP entity, where the second PDCP entity is associated with the bearer; and when the type of the bearer is type 2, the generated first configuration does not include a configuration of a second PDCP entity. In addition, regardless of type 2 or type 3, the first configuration further includes at least one of an identifier of the bearer, an identifier of an EPS bearer corresponding to the bearer, a configuration of a second RLC entity, a configuration of a second LCH, a configuration of a second MAC entity, and a configuration of a second PHY entity, where the second RLC entity, the second LCH, the second MAC entity, and the second PHY entity are associated with the bearer.

S203. The second network device sends the first configuration to the first network device, so that the first network device sends the first configuration to the UE.

According to the radio bearer configuration method provided by this embodiment of the present invention, a first network device sends a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 10:
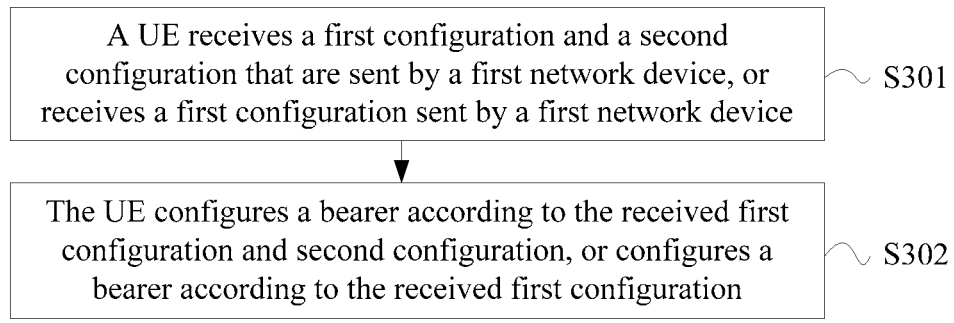
FIG. 10 is a schematic flowchart of still another embodiment of a radio bearer configuration method according to the present invention.

FIG. 10 is a schematic flowchart of still another embodiment of a radio bearer configuration method according to the present invention. As shown in FIG. 10, the method includes:

S301. A UE receives a first configuration and a second configuration that are sent by a first network device, or receives a first configuration sent by a first network device.

The first configuration is generated by a second network device and is sent by the second network device to the first network device, and the second configuration is generated by the first network device.

For example, when the UE receives the first configuration and the second configuration that are sent by the first network device, the second configuration may include at least one of an identifier of a bearer, an identifier of an EPS bearer corresponding to the bearer, a configuration of a first Packet Data Convergence Protocol PDCP entity, a configuration of a first Radio Link Control RLC entity, a configuration of a first logical channel LCH, a configuration of a first Media Access Control MAC entity, and a configuration of a first physical PHY entity, and the first configuration includes at least one of the identifier of the bearer, the identifier of the EPS bearer corresponding to the bearer, a configuration of a second RLC entity, a configuration of a second LCH, a configuration of a second MAC entity, and a configuration of a second PHY entity, where the first PDCP entity, the first RLC entity, the first LCH, the first MAC entity, the first PHY entity, the second RLC entity, the second LCH, the second MAC entity, and the second PHY entity are associated with the bearer. Preferably:

When the UE receives the first configuration sent by the first network device, the first configuration may include at least one of an identifier of a bearer, an identifier of an EPS bearer corresponding to the bearer, a configuration of a second PDCP entity, a configuration of a second RLC entity, a configuration of a second LCH, a configuration of a second MAC entity, and a configuration of a second PHY entity, where the second PDCP entity, the second RLC entity, the second LCH, the second MAC entity, and the second PHY entity are associated with the bearer.

S302. The UE configures a bearer according to the received first configuration and second configuration, or configures a bearer according to the received first configuration.

Preferably, the configuring a bearer according to the received first configuration and second configuration includes at least one of the following operations:

establishing the first PDCP entity, the first RLC entity, and the first LCH respectively according to the configuration of the first PDCP entity, the configuration of the first RLC entity, and the configuration of the first LCH, establishing the second RLC entity and the second LCH respectively according to the configuration of the second RLC entity and the configuration of the second LCH, and indicating to a non-access stratum NAS that the bearer has been established and the identifier of the EPS bearer; or releasing the first PDCP entity, the first RLC entity, and the first LCH, and establishing a second PDCP entity, the second RLC entity, and the second LCH respectively according to a configuration of the second PDCP entity, the configuration of the second RLC entity, and the configuration of the second LCH; or modifying the first PDCP entity, the first RLC entity, or the first LCH respectively according to the configuration of the first PDCP entity, the configuration of the first RLC entity, or the configuration of the first LCH, and establishing the second RLC entity and the second LCH respectively according to the configuration of the second RLC entity and the configuration of the second LCH; or releasing a second PDCP entity, the second RLC entity, and the second LCH, and newly establishing the first PDCP entity, the first RLC entity, and the first LCH respectively according to the configuration of the first PDCP entity, the configuration of the first RLC entity, and the configuration of the first LCH; or releasing a second PDCP entity, the second RLC entity, and the second LCH, establishing the first PDCP entity, the first RLC entity, and the first LCH respectively according to the configuration of the first PDCP entity, the configuration of the first RLC entity, and the configuration of the first LCH, and establishing the second RLC entity and the second LCH respectively according to the configuration of the second RLC entity and the configuration of the second LCH; or releasing the first PDCP entity, the first RLC entity, and the first LCH, releasing the second RLC entity and the second LCH, and indicating to a NAS that the bearer has been released and the identifier of the EPS bearer; or releasing the second RLC entity and the second LCH, and modifying the first PDCP entity, the first RLC entity, or the first LCH respectively according to the configuration of the first PDCP entity, the configuration of the first RLC entity, or the configuration of the first LCH; or releasing the first PDCP entity, the first RLC entity, and the first LCH, releasing the second RLC entity and the second LCH, and establishing a second PDCP entity, the second RLC entity, and the second LCH respectively according to a configuration of the second PDCP entity, the configuration of the second RLC entity, and the configuration of the second LCH; or modifying the first PDCP entity, the first RLC entity, the first LCH, the second RLC entity, or the second LCH respectively according to the configuration of the first PDCP entity, the configuration of the first RLC entity, the configuration of the first LCH, the configuration of the second RLC entity, or the configuration of the second LCH; or establishing or modifying the first MAC entity according to the configuration of the first MAC entity; or releasing the first MAC entity; or establishing or modifying the first PHY entity according to the configuration of the first PHY entity; or releasing the first PHY entity; or establishing or modifying the second MAC entity according to the configuration of the second MAC entity; or releasing the second MAC entity; or establishing or modifying the second PHY entity according to the configuration of the second PHY entity; or releasing the second PHY entity.

Preferably, the configuring a bearer according to the received first configuration includes at least one of the following cases:

establishing the second PDCP entity, the second RLC entity, and the second LCH respectively according to the configuration of the second PDCP entity, the configuration of the second RLC entity, and the configuration of the second LCH, and indicating to a NAS that the bearer has been established and the identifier of the EPS bearer; or modifying the second PDCP entity, the second RLC entity, or the second LCH respectively according to the configuration of the second PDCP entity, the configuration of the second RLC entity, or the configuration of the second LCH; or releasing the second PDCP entity, the second RLC entity, and the second LCH, and indicating to a NAS that the bearer has been released and the identifier of the EPS bearer; or establishing or modifying the second MAC entity according to the configuration of the second MAC entity; or releasing the second MAC entity; or establishing or modifying the second PHY entity according to the configuration of the second PHY entity; or releasing the second PHY entity.

According to the radio bearer configuration method provided by this embodiment of the present invention, a first network device sends a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 11A:
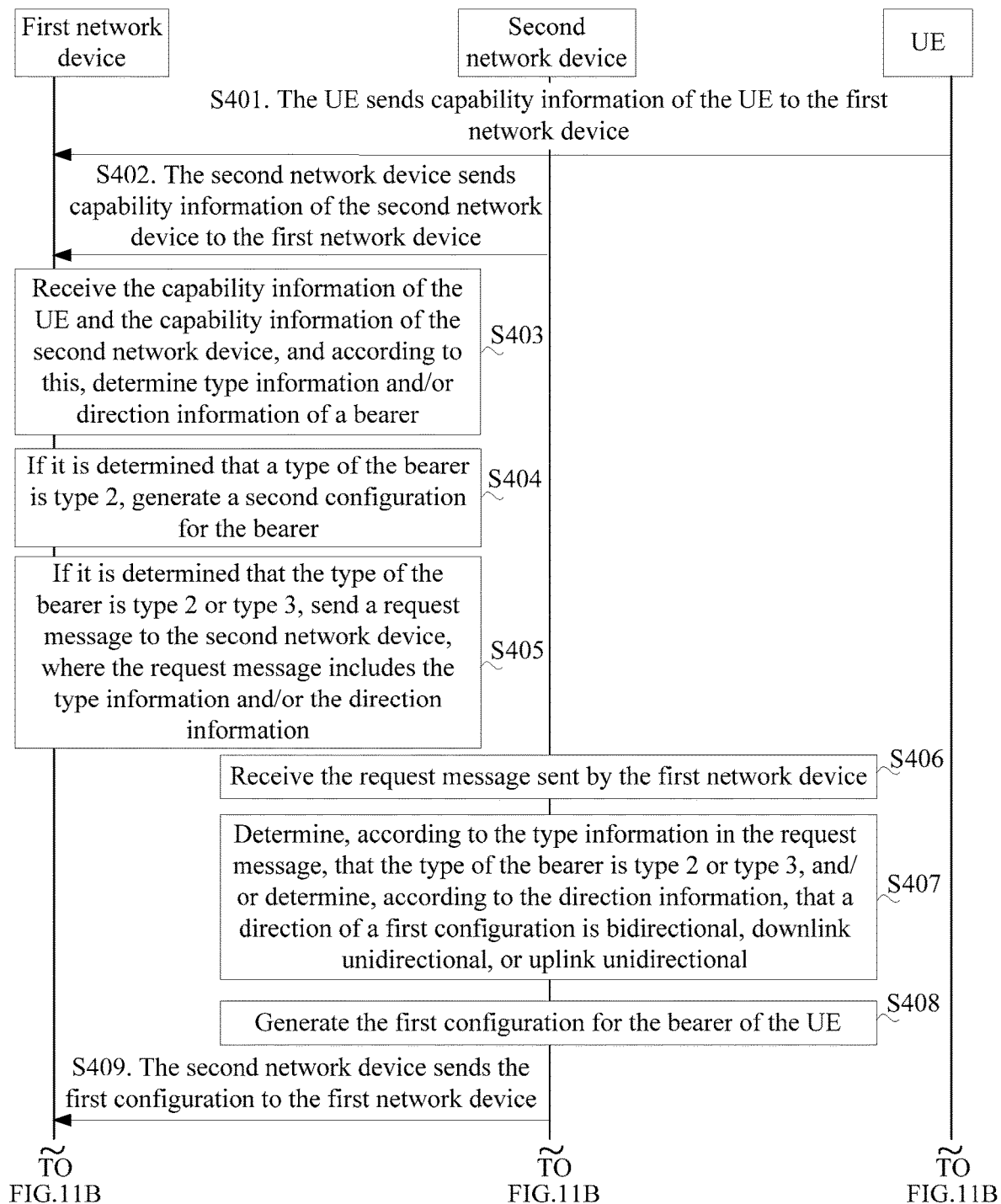
FIG. 11A and FIG. 11B are a schematic flowchart of yet another embodiment of a radio bearer configuration method according to the present invention.
Figure 11B:
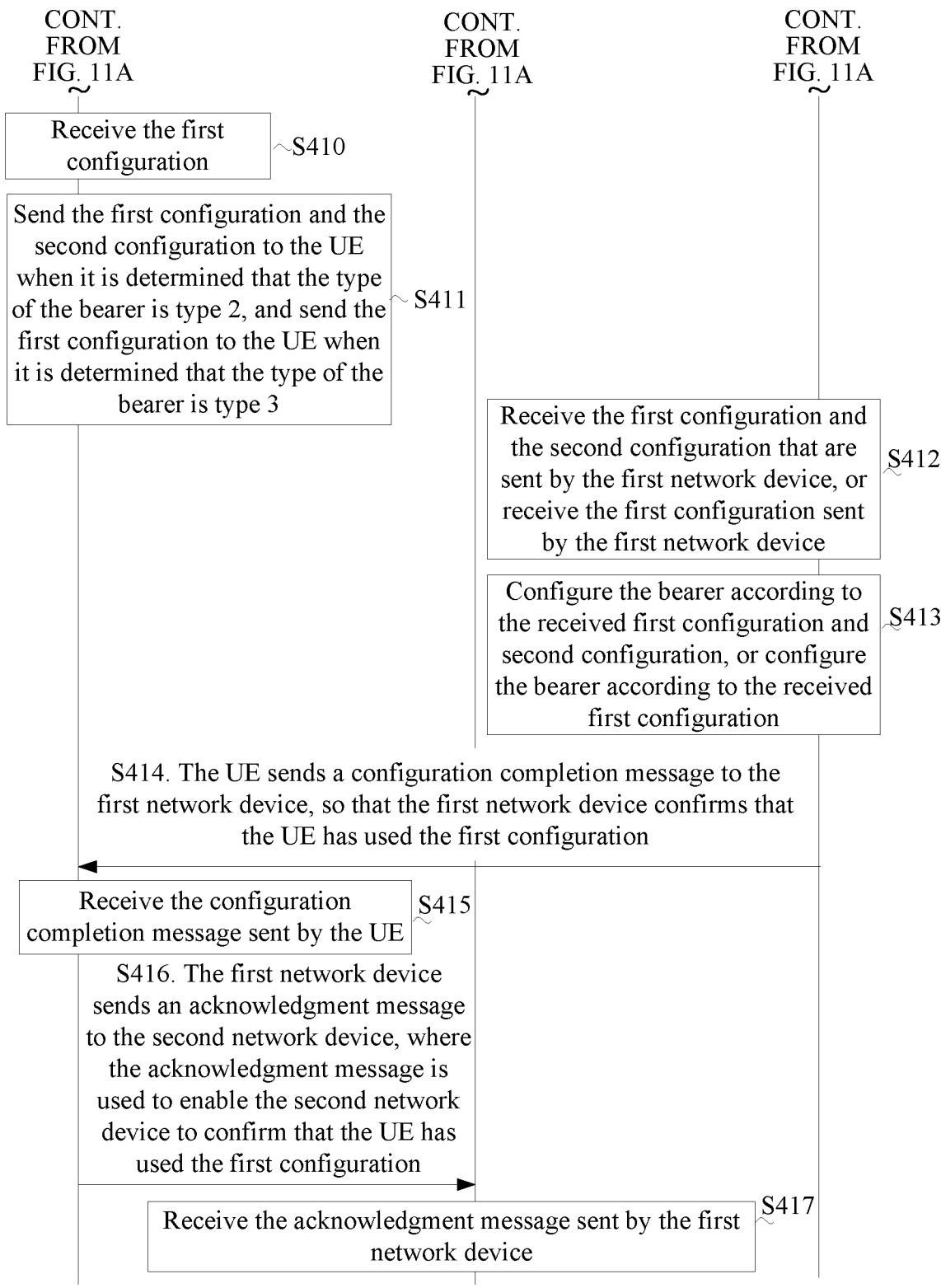

FIG. 11A and FIG. 11B are a schematic flowchart of yet another embodiment of a radio bearer configuration method according to the present invention. This embodiment is described by using an example in which both a UE and a second network device send their capability information to a first network device, which, however, is not intended to impose any limitation. The capability information of the UE and/or the second network device may also be system default and is prestored in the first network device. As shown in FIG. 11A and FIG. 11B, the method includes:

It should be noted that S401 and S402 may be in any ordinal relationship.

S401. The UE sends the capability information of the UE to the first network device.

The capability information of the UE is used to indicate that a type of a bearer supported by the UE is type 2 and/or type 3, a type-2 bearer is served by the first network device and the second network device, and a type-3 bearer is served only by the second network device.

S402. The second network device sends the capability information of the second network device to the first network device.

The capability information of the second network device is used to indicate that a type of a bearer supported by the second network device is type 2 and/or type 3.

S403. The first network device receives the capability information of the UE and the capability information of the second network device, and according to this, determines type information and/or direction information of a bearer.

The type information is used to indicate that a type of the bearer is type 2 or type 3, and the direction information is used to indicate that a direction of a first configuration is bidirectional, downlink unidirectional, or uplink unidirectional.

It should be noted that the first network device may execute S404 and S405 after S403, and S404 and S405 may be in any ordinal relationship.

S404. If the first network device determines that a type of the bearer is type 2, the first network device generates a second configuration for the bearer.

For example, the second configuration may be at least one of a configuration of a first Packet Data Convergence Protocol PDCP entity, a configuration of a first Radio Link Control RLC entity, a configuration of a first logical channel LCH, a configuration of a first Media Access Control MAC entity, a configuration of a first physical PHY entity, an identifier of an EPS bearer corresponding to the bearer, and an identifier of the bearer, where the first PDCP entity, the first RLC entity, the first LCH, the first MAC entity, and the first PHY entity are all associated with the bearer.

S405. If the first network device determines that the type of the bearer is type 2 or type 3, the first network device sends a request message to the second network device, where the request message includes the determined type information and/or direction information.

For example, if at this time, the first network device has already generated the second configuration, when it is determined that the type of the bearer is type 2, the request message sent by the first network device includes the second configuration; and when it is determined that the type of the bearer is type 3, the request message sent by the first network device does not include the second configuration.

For example, the type information in the request message may be the capability information of the UE, where the capability information of the UE is used to indicate that the type of the bearer supported by the UE is type 2 or type 3, and the capability information of the UE is sent by the UE to the first network device in advance.

Alternatively, the type information in the request message may be a first tunnel endpoint identifier or a second tunnel endpoint identifier. When it is determined that the type of the bearer is type 2, the sent type information is the first tunnel endpoint identifier; and when it is determined that the type of the bearer is type 3, the sent type information is the second tunnel endpoint identifier. The first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW.

For example, the direction information in the request message may be quality of service QoS of the bearer. When it is determined that the direction of the first configuration is bidirectional, the sent QoS includes uplink QoS and downlink QoS; when it is determined that the direction of the first configuration is uplink unidirectional, the sent QoS includes only uplink QoS; and when it is determined that the direction of the first configuration is downlink unidirectional, the sent QoS includes only downlink QoS.

S406. The second network device receives the request message sent by the first network device.

S407. The second network device determines, according to the type information in the request message, that the type of the bearer is type 2 or type 3, and/or determines, according to the direction information, that a direction of a first configuration is bidirectional, downlink unidirectional, or uplink unidirectional.

For example, the request message received by the second network device includes or does not include the second configuration; when the received request message includes the second configuration, it is determined that the type of the bearer is type 2; and when the received request message does not include the second configuration, it is determined that the type of the bearer is type 3.

Alternatively, the type information included in the request message received by the second network device is the capability information of the UE, where the capability information of the UE is used to indicate the type of the bearer supported by the UE; when the received capability information of the UE indicates that the type of the bearer supported by the UE is type 2, it is determined that the type of the bearer is type 2; and when the received capability information of the UE indicates that the type of the bearer supported by the UE is type 3, it is determined that the type of the bearer is type 3.

Alternatively, the type information included in the request message received by the second network device is a first tunnel endpoint identifier or a second tunnel endpoint identifier; when the received request message includes the first tunnel endpoint identifier, it is determined that the type of the bearer is type 2; and when the received request message includes the second tunnel endpoint identifier, it is determined that the type of the bearer is type 3. The first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW.

For example, the direction information in the request message received by the second network device is quality of service QoS of the bearer; if the received QoS includes uplink QoS and downlink QoS, it is determined that the direction of the first configuration is bidirectional; if the received QoS includes only uplink QoS, it is determined that the direction of the first configuration is uplink unidirectional; and if the received QoS includes only downlink QoS, it is determined that the direction of the first configuration is downlink unidirectional.

S408. The second network device generates the first configuration for the bearer of the UE.

For example, when the second network device determines that the type of the bearer is type 3, the generated first configuration includes a configuration of a second PDCP entity, where the second PDCP entity is associated with the bearer; and when the type of the bearer is type 2, the generated first configuration does not include a configuration of a second PDCP entity. In addition, regardless of type 2 or type 3, the first configuration further includes at least one of a configuration of a second RLC entity, a configuration of a second LCH, a configuration of a second MAC entity, a configuration of a second PHY entity, an identifier of an EPS bearer corresponding to the bearer, and an identifier of the bearer, where the second RLC entity, the second LCH, the second MAC entity, and the second PHY entity are associated with the bearer.

Further, when it is determined that the direction of the first configuration is bidirectional, the configuration of the second RLC entity includes an RLC uplink configuration and an RLC downlink configuration; when it is determined that the direction of the first configuration is downlink unidirectional, the configuration of the second RLC entity includes only an RLC downlink configuration; and when it is determined that the direction of the first configuration is uplink unidirectional, the configuration of the second RLC entity includes only an RLC uplink configuration.

S409. The second network device sends the first configuration to the first network device.

S410. The first network device receives the first configuration.

S411. The first network device sends the first configuration and the second configuration to the UE when it is determined that the type of the bearer is type 2, and sends the first configuration to the UE when it is determined that the type of the bearer is type 3.

S412. The UE receives the first configuration and the second configuration that are sent by the first network device, or receives the first configuration sent by the first network device.

S413. The UE configures the bearer according to the received first configuration and second configuration, or configures the bearer according to the received first configuration.

S414. The UE sends a configuration completion message to the first network device, so that the first network device confirms that the UE has used the first configuration.

S415. The first network device receives the configuration completion message sent by the UE.

S416. The first network device sends an acknowledgment message to the second network device, where the acknowledgment message is used to enable the second network device to confirm that the UE has used the first configuration S417. The second network device receives the acknowledgment message sent by the first network device.

According to the radio bearer configuration method provided by this embodiment of the present invention, a first network device sends a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 12:
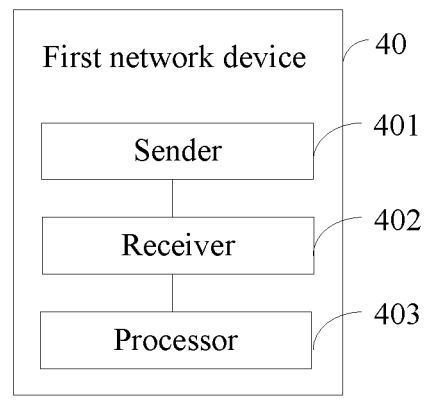
FIG. 12 is a schematic structural diagram of an embodiment of another first network device according to the present invention.

FIG. 12 is a schematic structural diagram of an embodiment of another first network device according to the present invention. As shown in FIG. 12, a first network device 40 includes a sender 401, a receiver 402, and a processor 403.

The sender 401 is configured to send a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device.

The receiver 402 is configured to receive the first configuration generated by the second network device.

The processor 403 is configured to generate a second configuration for the bearer when it is determined that the type of the bearer is type 2.

For example, the second configuration generated by the processor 403 is at least one of an identifier of the bearer, an identifier of an EPS bearer corresponding to the bearer, a configuration of a first PDCP entity, a configuration of a first RLC entity, a configuration of a first LCH, a configuration of a first MAC entity, and a configuration of a first PHY entity, where the first PDCP entity, the first RLC entity, the first LCH, the first MAC entity, and the first PHY entity are all associated with the bearer.

The sender 401 is further configured to: send the first configuration and the second configuration to the UE when it is determined that the type of the bearer is type 2, and send the first configuration to the UE when it is determined that the type of the bearer is type 3.

Further, the processor 403 is further configured to determine type information of the bearer and/or direction information of the first configuration, where the type information is used to indicate that the type of the bearer is type 2 or type 3, and the direction information is used to indicate that a direction of the first configuration is bidirectional, downlink unidirectional, or uplink unidirectional.

The sender 401 is specifically configured to send the request message including the type information and/or the direction information.

For example, the processor 403 is specifically configured to determine the type information according to capability information of the UE and/or capability information of the second network device, where the capability information of the UE is used to indicate that a type of a bearer supported by the UE is type 2 and/or type 3, the capability information of the second network device is used to indicate that a type of a bearer supported by the second network device is type 2 and/or type 3, the capability information of the UE is sent by the UE, and the capability information of the second network device is sent by the second network device or is system default.

Alternatively, when the processor 403 determines that the type of the bearer is type 2, the request message sent by the sender 401 includes the second configuration; and when the processor 403 determines that the type of the bearer is type 3, the request message sent by the sender 401 does not include the second configuration.

Alternatively, the type information sent by the sender 401 is capability information of the UE, where the capability information of the UE is used to indicate that a type of a bearer supported by the UE is type 2 or type 3, and the capability information of the UE is sent by the UE.

Alternatively, the type information sent by the sender 401 is a first tunnel endpoint identifier or a second tunnel endpoint identifier. When the processor 403 determines that the type of the bearer is type 2, the type information sent by the sender 401 is the first tunnel endpoint identifier; and when the processor 403 determines that the type of the bearer is type 3, the type information sent by the sender 401 is the second tunnel endpoint identifier. The first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW.

For example, the direction information sent by the sender 401 is quality of service QoS of the bearer; when the processor 403 determines that the direction of the first configuration is bidirectional, the QoS sent by the sender 401 includes uplink QoS and downlink QoS; when the processor 403 determines that the direction of the first configuration is uplink unidirectional, the QoS sent by the sender 401 includes only uplink QoS; and when the processor 403 determines that the direction of the first configuration is downlink unidirectional, the QoS sent by the sender 401 includes only downlink QoS.

Further, the receiver 402 is further configured to receive a configuration completion message sent by the UE, and the sender 401 is further configured to send an acknowledgment message to the second network device, where the acknowledgment message is used to enable the second network device to confirm that the UE has used the first configuration.

According to the first network device provided by this embodiment of the present invention, the first network device sends a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 13:
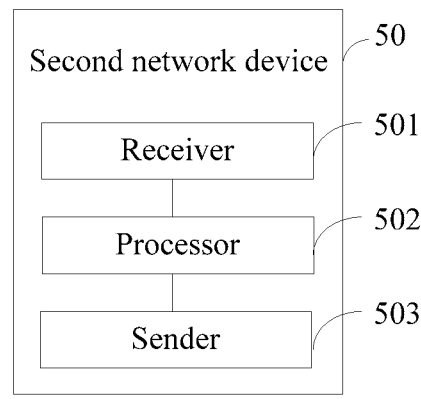
FIG. 13 is a schematic structural diagram of an embodiment of another second network device according to the present invention.

FIG. 13 is a schematic structural diagram of an embodiment of another second network device according to the present invention. As shown in FIG. 13, a second network device 50 includes a receiver 501, a processor 502, and a sender 503.

The receiver 501 is configured to receive a request message sent by a first network device, where the request message is used to generate a first configuration for a bearer of a user equipment UE, and a type of the bearer is type 2 or type 3, where a type-2 bearer is served by the first network device and the second network device, and a type-3 bearer is served only by the second network device.

The processor 502 is configured to generate the first configuration for the bearer of the user equipment UE according to the request message.

For example, when the processor 502 determines that the type of the bearer is type 3, the generated first configuration includes a configuration of a second PDCP entity, where the second PDCP entity is associated with the bearer; and when the processor 502 determines that the type of the bearer is type 2, the generated first configuration does not include a configuration of a second PDCP entity.

Further, no matter type 2 or type 3, the processor 502 is further configured to generate at least one of a configuration of a second RLC entity, a configuration of a second MAC entity, and a configuration of a second PHY entity, where the second RLC entity, the second MAC entity, and the second PHY entity are associated with the bearer.

The sender 503 is configured to send the first configuration to the first network device, so that the first network device sends the first configuration to the UE.

It should be noted that the request message includes type information of the bearer and/or direction information of the first configuration, where the type information is used to indicate that the type of the bearer is type 2 or type 3, and the direction information is used to indicate that a direction of the first configuration is bidirectional, downlink unidirectional, or uplink unidirectional.

Further, the processor 502 is further configured to: generate the first configuration for the bearer according to the type of the bearer if it is determined, according to the type information, that the type of the bearer is type 2 or type 3; generate the first configuration for the bearer according to the direction of the first configuration if it is determined, according to the direction information, that the direction of the first configuration is bidirectional, downlink unidirectional, or uplink unidirectional; and generate the first configuration for the bearer according to the type of the bearer and the direction of the first configuration if it is determined, according to the type information, that the type of the bearer is type 2 or type 3, and if it is determined, according to the direction information, that the direction of the first configuration is bidirectional, downlink unidirectional, or uplink unidirectional.

For example, the request message includes or does not include a second configuration generated by the first network device for the bearer, where the second configuration is at least one of an identifier of the bearer, an identifier of an EPS bearer corresponding to the bearer, a configuration of a first PDCP entity, a configuration of a first RLC entity, a configuration of a first LCH, a configuration of a first MAC entity, and a configuration of a first PHY entity, where the first PDCP entity, the first RLC entity, the first LCH, the first MAC entity, and the first PHY entity are all associated with the bearer. When the request message received by the receiver 501 includes the second configuration, the processor 502 determines that the type of the bearer is type 2; and when the request message received by the receiver 501 does not include the second configuration, the processor 502 determines that the type of the bearer is type 3.

Alternatively, the type information received by the receiving unit 501 is capability information of the UE, where the capability information of the UE is used to indicate a type of a bearer supported by the UE; when the capability information of the UE received by the receiver 501 indicates that the type of the bearer supported by the UE is type 2, the processor 502 determines that the type of the bearer is type 2; and when the capability information of the UE received by the receiver 501 indicates that the type of the bearer supported by the UE is type 3, the processor 502 determines that the type of the bearer is type 3.

Alternatively, the type information received by the receiver 501 is a first tunnel endpoint identifier or a second tunnel endpoint identifier, where the first tunnel endpoint identifier is allocated by the first network device and is used by the second network device to send a data packet of the bearer to the first network device, and the second tunnel endpoint identifier is allocated by a serving gateway SGW and is used by the second network device to send a data packet of the bearer to the SGW. When the request message received by the receiver 501 includes the first tunnel endpoint identifier, the processor 502 determines that the type of the bearer is type 2; and when the request message received by the receiver 501 includes the second tunnel endpoint identifier, the processor 502 determines that the type of the bearer is type 3.

For example, the direction information received by the receiver 501 is quality of service QoS of the bearer; if the QoS received by the receiver 501 includes uplink QoS and downlink QoS, the processor 502 determines that the direction of the first configuration is bidirectional; if the QoS received by the receiver 501 includes only uplink QoS, the processor 502 determines that the direction of the first configuration is uplink unidirectional; and if the QoS received by the receiver 501 includes only downlink QoS, the processor 502 determines that the direction of the first configuration is downlink unidirectional.

Alternatively, the first configuration generated by the processor 502 includes a configuration of a second RLC entity, where the second RLC entity is associated with the bearer; when the processor 502 determines that the direction of the first configuration is bidirectional, the configuration of the second RLC entity includes an RLC uplink configuration and an RLC downlink configuration; when the processor 502 determines that the direction of the first configuration is downlink unidirectional, the configuration of the second RLC entity includes only an RLC downlink configuration; and when the processor 502 determines that the direction of the first configuration is uplink unidirectional, the configuration of the second RLC entity includes only an RLC uplink configuration.

Further, the receiver 501 is further configured to receive an acknowledgment message sent by the first network device, where the acknowledgment message is used to confirm that the UE has used the first configuration; and the processor 502 is further configured to confirm that the UE has used the first configuration.

According to the second network device provided by this embodiment of the present invention, a first network device sends a request message to the second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 14:
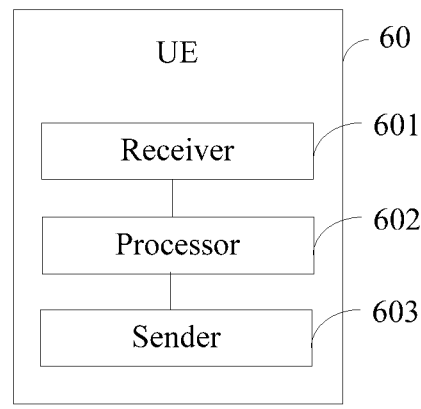
FIG. 14 is a schematic structural diagram of an embodiment of another UE according to the present invention.

FIG. 14 is a schematic structural diagram of an embodiment of another UE according to the present invention. As shown in FIG. 14, a UE 60 includes a receiver 601, a processor 602, and a sender 603.

The receiver 601 is configured to receive a first configuration and a second configuration that are sent by a first network device, or configured to receive a first configuration sent by a first network device, where the first configuration is generated by a second network device and is sent by the second network device to the first network device, and the second configuration is generated by the first network device.

The processor 602 is configured to configure a bearer according to the first configuration and the second configuration that are received by the receiver 601, or configured to configure a bearer according to the first configuration received by the receiver 601.

Further, the UE 60 further includes the sender 603 which is configured to send capability information of the UE to the first network device, where the capability information of the UE is used to indicate that a type of a bearer supported by the UE is type 2 and/or type 3, a type-2 bearer is served by the first network device and the second network device, and a type-3 bearer is served only by the second network device.

For example, the receiver 601 is specifically configured to receive the first configuration and the second configuration that are sent by the first network device, where the second configuration includes at least one of an identifier of the bearer, an identifier of an EPS bearer corresponding to the bearer, a configuration of a first Packet Data Convergence Protocol PDCP entity, a configuration of a first Radio Link Control RLC entity, a configuration of a first logical channel LCH, a configuration of a first Media Access Control MAC entity, and a configuration of a first physical PHY entity, and the first configuration includes at least one of the identifier of the bearer, the identifier of the EPS bearer corresponding to the bearer, a configuration of a second RLC entity, a configuration of a second LCH, a configuration of a second MAC entity, and a configuration of a second PHY entity, where the first PDCP entity, the first RLC entity, the first LCH, the first MAC entity, the first PHY entity, the second RLC entity, the second LCH, the second MAC entity, and the second PHY entity are associated with the bearer, and the configuration of the second RLC entity includes an RLC uplink configuration and/or an RLC downlink configuration.

Alternatively, the receiver 601 is specifically configured to receive the first configuration sent by the first network device, where the first configuration includes at least one of an identifier of the bearer, an identifier of an EPS bearer corresponding to the bearer, a configuration of a second PDCP entity, a configuration of a second RLC entity, a configuration of a second LCH, a configuration of a second MAC entity, and a configuration of a second PHY entity, where the second PDCP entity, the second RLC entity, the second LCH, the second MAC entity, and the second PHY entity are associated with the bearer, and the configuration of the second RLC entity includes an RLC uplink configuration and/or an RLC downlink configuration.

Specifically, an operation of configuring the bearer by the processor 602 according to the first configuration and the second configuration that are received by the receiver 601 may be:

establishing the first PDCP entity, the first RLC entity, and the first LCH respectively according to the configuration of the first PDCP entity, the configuration of the first RLC entity, and the configuration of the first LCH, establishing the second RLC entity and the second LCH respectively according to the configuration of the second RLC entity and the configuration of the second LCH, and indicating to a non-access stratum (NAS) that the bearer has been established and the identifier of the EPS bearer; or releasing the first PDCP entity, the first RLC entity, and the first LCH, and establishing a second PDCP entity, the second RLC entity, and the second LCH respectively according to a configuration of the second PDCP entity, the configuration of the second RLC entity, and the configuration of the second LCH; or modifying the first PDCP entity, the first RLC entity, or the first LCH respectively according to the configuration of the first PDCP entity, the configuration of the first RLC entity, or the configuration of the first LCH, and establishing the second RLC entity and the second LCH respectively according to the configuration of the second RLC entity and the configuration of the second LCH; or releasing a second PDCP entity, the second RLC entity, and the second LCH, and newly establishing the first PDCP entity, the first RLC entity, and the first LCH respectively according to the configuration of the first PDCP entity, the configuration of the first RLC entity, and the configuration of the first LCH; or releasing a second PDCP entity, the second RLC entity, and the second LCH, establishing the first PDCP entity, the first RLC entity, and the first LCH respectively according to the configuration of the first PDCP entity, the configuration of the first RLC entity, and the configuration of the first LCH, and establishing the second RLC entity and the second LCH respectively according to the configuration of the second RLC entity and the configuration of the second LCH; or releasing the first PDCP entity, the first RLC entity, and the first LCH, releasing the second RLC entity and the second LCH, and indicating to a NAS that the bearer has been released and the identifier of the EPS bearer; or releasing the second RLC entity and the second LCH, and modifying the first PDCP entity, the first RLC entity, or the first LCH respectively according to the configuration of the first PDCP entity, the configuration of the first RLC entity, or the configuration of the first LCH; or releasing the first PDCP entity, the first RLC entity, and the first LCH, releasing the second RLC entity and the second LCH, and establishing a second PDCP entity, the second RLC entity, and the second LCH respectively according to a configuration of the second PDCP entity, the configuration of the second RLC entity, and the configuration of the second LCH; or modifying the first PDCP entity, the first RLC entity, the first LCH, the second RLC entity, or the second LCH respectively according to the configuration of the first PDCP entity, the configuration of the first RLC entity, the configuration of the first LCH, the configuration of the second RLC entity, or the configuration of the second LCH; or establishing or modifying the first MAC entity according to the configuration of the first MAC entity; or releasing the first MAC entity; or establishing or modifying the first PHY entity according to the configuration of the first PHY entity; or releasing the first PHY entity; or establishing or modifying the second MAC entity according to the configuration of the second MAC entity; or releasing the second MAC entity; or establishing or modifying the second PHY entity according to the configuration of the second PHY entity; or releasing the second PHY entity.

The processor 602 may determine, according to configurations and/or indication information specifically included in the first configuration and the second configuration, that at least one of the foregoing specific operations needs to be executed.

Specifically, an operation of configuring the bearer by the processor 602 according to the first configuration received by the receiver 601 may be:

establishing the second PDCP entity, the second RLC entity, and the second LCH respectively according to the configuration of the second PDCP entity, the configuration of the second RLC entity, and the configuration of the second LCH, and indicating to a NAS that the bearer has been established and the identifier of the EPS bearer; or modifying the second PDCP entity, the second RLC entity, or the second LCH respectively according to the configuration of the second PDCP entity, the configuration of the second RLC entity, or the configuration of the second LCH; or releasing the second PDCP entity, the second RLC entity, and the second LCH, and indicating to a NAS that the bearer has been released and the identifier of the EPS bearer; or establishing or modifying the second MAC entity according to the configuration of the second MAC entity; or releasing the second MAC entity; or establishing or modifying the second PHY entity according to the configuration of the second PHY entity; or releasing the second PHY entity.

The processor 602 may determine, according to a configuration and/or indication information specifically included in the first configuration, that at least one of the foregoing specific operations needs to be executed.

Further, the sender 603 is further configured to send a configuration completion message to the first network device after the processor 602 configures the bearer, so that the first network device confirms that the UE has used the first configuration and the second configuration or has used the first configuration. According to the UE provided by this embodiment of the present invention, a first network device sends a request message to a second network device, where the request message is used to enable the second network device to generate a first configuration for a bearer of the user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Figure 15:
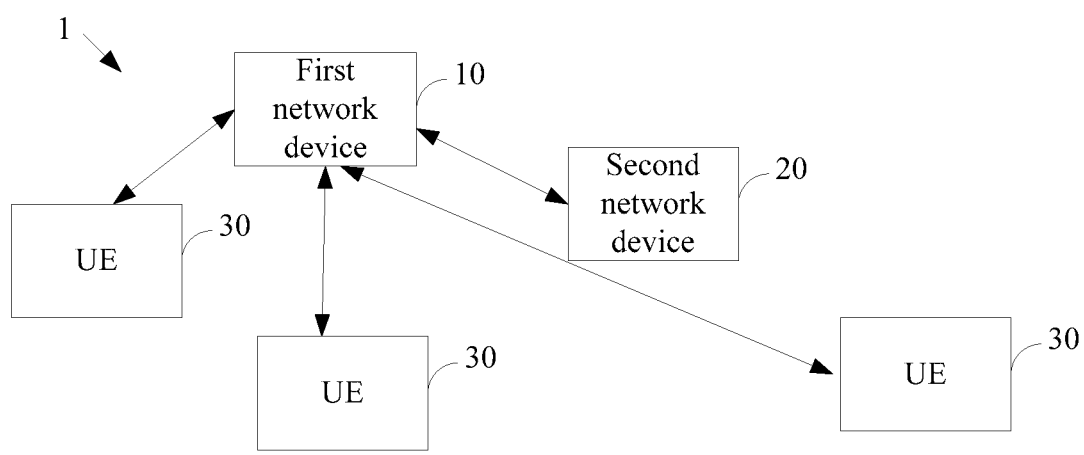
FIG. 15 is a schematic structural diagram of an embodiment of a radio bearer configuration system according to the present invention.

FIG. 15 is a schematic structural diagram of an embodiment of a radio bearer configuration system according to the present invention. As shown in FIG. 15, a system 1 includes:

a first network device 10, a second network device 20, and at least one UE 30, where the first network device 10 may be an MeNB, and the second network device 20 may be an SeNB.

In the system, the first network device 10 may use the structure shown in FIG. 2 or FIG. 3, the second network device 20 may use the structure shown in FIG. 4 or FIG. 5, and the UE 30 may use the structure shown in FIG. 6 or FIG. 7. The system 1 according to this embodiment may be configured to execute the technical solutions in the method embodiments shown in FIG. 8 to FIG. 11A and FIG. 11B. Implementation principles and technical effects thereof are similar, and details are not repeatedly described herein.

Alternatively, the system includes:

a first network device, a second network device, and at least one UE, where the first network device may be an MeNB, and the second network device may be an SeNB.

The first network device may use the structure shown in FIG. 12, the second network device may use the structure shown in FIG. 13, and the UE may use the structure shown in FIG. 14. The system 1 according to this embodiment may be configured to execute the technical solutions in the method embodiments shown in FIG. 8 to FIG. 11A and FIG. 11B. Implementation principles and technical effects thereof are similar, and details are not repeatedly described herein.

According to the radio bearer configuration system provided by this embodiment of the present invention, a first network device sends a request message to a second network device, where the request message is used to enable the second network device to generate a first configuration for a bearer of a user equipment UE, and a type of the bearer is type 2 or type 3, where a type-2 bearer is served by the first network device and the second network device, and a type-3 bearer is served only by the second network device; receives the first configuration generated by the second network device; generates a second configuration for the bearer when it is determined that the type of the bearer is type 2; and sends the first configuration and the second configuration to the UE when it is determined that the type of the bearer is type 2, and sends the first configuration to the UE when it is determined that the type of the bearer is type 3. In this way, for bearer types of type 2 and type 3, a first configuration is generated by a second network device. Because the second network device is clearer about usage of its radio resources, bearers can be more properly configured when some configurations are generated by the second network device, which effectively solves a problem, caused by inappropriate configurations, that a radio resource utilization rate of the second network device is low and that a throughput of a UE bearer is low.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A network device, wherein the network device is a second network device and comprises:

a receiver, configured to receive a request message sent by a first network device, wherein the request message is used to enable the second network device to generate a first configuration for a bearer of a user equipment (UE), and a type of the bearer is type 2 or type 3, wherein the type 2 bearer is served by the first network device and the second network device, and the type 3 bearer is served only by the second network device;

wherein the request message comprises: direction information of the first configuration, and type information of the bearer, wherein the direction information is used to indicate that a direction of the first configuration is bidirectional, downlink unidirectional, or uplink unidirectional, and wherein the type information specifies that the type of the bearer is type 2 or type 3; and a processor, configured to determine, according to the type information, that the type of the bearer is type 2 or type 3; and the processor is further configured to generate the first configuration for the bearer according to the type information, that specifies that the type of the bearer is type 2 or type 3; and a sender, configured to send the first configuration to the first network device, to enable the first network device to send the first configuration to the UE.

2. The second network device according to claim 1, wherein the generating the first configuration for the bearer of the UE according to the request message comprises:

when it is determined that the type of the bearer is type 3, the generated first configuration comprises a configuration of a PDCP entity, wherein the PDCP entity is associated with the bearer; and when it is determined that the type of the bearer is type 2, the generated first configuration does not comprise the configuration of the PDCP entity.

3. The second network device according to claim 1, wherein:

the receiver is further configured to receive an acknowledgment message sent by the first network device, wherein the acknowledgment message is used to confirm that the UE has used the first configuration; and the processor is further configured to confirm, according to the acknowledgment message, that the UE has used the first configuration.

4. A radio bearer configuration method, comprising:

receiving, by a second network device, a request message sent by a first network device, wherein the request message is used to enable the second network device to generate a first configuration for a bearer of a user equipment (UE), and a type of the bearer is type 2 or type 3, wherein the type 2 bearer is served by the first network device and the second network device, and the type 3 bearer is served only by the second network device; wherein the request message comprises: direction information of the first configuration, and type information of the bearer, wherein the direction information is used to indicate that a direction of the first configuration is bidirectional, downlink unidirectional, or uplink unidirectional, and wherein the type information specifies that the type of the bearer is type 2 or type 3;

determining, by the second network device, according to the type information, that the type of the bearer is type 2 or type 3;

generating, by the second network device, the first configuration for the bearer according to the type information, that specifies that the type of the bearer is type 2 or type 3; and sending, by the second network device, the first configuration to the first network device, to enable the first network device to send the first configuration to the UE.

5. The method according to claim 4, wherein the generating the first configuration for the bearer according to the type information comprises:

when it is determined that the type of the bearer is type 3, the generated first configuration comprises a configuration of a packet data convergence protocol (PDCP) entity, wherein the PDCP entity is associated with the bearer; and when it is determined that the type of the bearer is type 2, the generated first configuration does not comprise the configuration of the PDCP entity.

6. The method according to claim 4, wherein:

the first configuration further comprises at least one of the identifier of the bearer, the identifier of the enhanced packet system (EPS) bearer corresponding to the bearer, a configuration of a radio link control (RLC) entity, a configuration of a logical channel (LCH), a configuration of a media access control (MAC) entity, and a configuration of a physical (PHY) entity, wherein the RLC entity, the LCH, the MAC entity, and the PHY entity are associated with the bearer.

7. The method according to claim 4, after the sending the first configuration to the first network device, further comprising:

receiving an acknowledgment message sent by the first network device, wherein the acknowledgment message is used to confirm that the UE has used the first configuration.

8. The second network device according to claim 2, wherein:

the first configuration generated by the processor further comprises at least one of an identifier of the bearer, an identifier of an enhanced packet system (EPS) bearer corresponding to the bearer, a configuration of a radio link control (RLC) entity, a configuration of a logical channel (LCH), a configuration of a media access control (MAC) entity, and a configuration of a physical (PHY) entity, wherein the RLC entity, the LCH, the MAC entity, and the PHY entity are associated with the bearer.

9. The second network device according to claim 1, wherein the processor is further configured to generate the first configuration for the bearer further according to the direction of the first configuration.

10. The second network device according to claim 1, wherein the sender is further configured to send the first configuration to the first network device to reduce a configuration load of the first network device.

11. The second network device according to claim 1, wherein the second network device is a second network device of a secondary cell group (SCG).

12. The second network device according to claim 11, wherein the second network device is a base station of the SCG.

13. The second network device according to claim 12, wherein the second network device is a secondary eNB.

14. The second network device according to claim 1, wherein the first network device is a first network device of a master cell group (MCG).

15. The second network device according to claim 14, wherein the first network device is a base station of the MCG.

16. The second network device according to claim 15, wherein the first network device is a master eNB.

17. The method according to claim 4, wherein the generating the first configuration for the bearer according to the type information comprises generating the first configuration for the bearer further according to the direction of the first configuration.

18. The method according to claim 4, wherein the sending the first configuration to the first network device comprises sending the first configuration to the first network device to reduce a configuration load of the first network device.

19. The method according to claim 4, wherein the second network device is a second network device of a secondary cell group (SCG).

20. The method according to claim 19, wherein the second network device is a base station of the SCG.

21. The method according to claim 20, wherein the second network device is a secondary eNB.

22. The method according to claim 4, wherein the first network device is a first network device of a master cell group (MCG).

23. The method according to claim 22, wherein the first network device is a base station of the MCG.

24. The method according to claim 23, wherein the first network device is a master eNB.

* * * * *